United States Patent
Speidel et al.

(10) Patent No.: US 11,595,114 B2
(45) Date of Patent: *Feb. 28, 2023

(54) METHOD AND APPARATUS FOR HANDLING COMMUNICATIONS BETWEEN SPACECRAFT OPERATING IN AN ORBITAL ENVIRONMENT AND TERRESTRIAL TELECOMMUNICATIONS DEVICES THAT USE TERRESTRIAL BASE STATION COMMUNICATIONS

(71) Applicant: Lynk Global, Inc., Falls Church, VA (US)

(72) Inventors: Tyghe Robert Speidel, New York, NY (US); Andrew J. Gerber, Damestown, MD (US)

(73) Assignee: Lynk Global, Inc., Falls Church, VA (US)

( * ) Notice: Subject to any disclaimer, the term of this patent is extended or adjusted under 35 U.S.C. 154(b) by 68 days.

This patent is subject to a terminal disclaimer.

(21) Appl. No.: 17/234,673

(22) Filed: Apr. 19, 2021

(65) Prior Publication Data

US 2022/0006515 A1 Jan. 6, 2022

Related U.S. Application Data

(63) Continuation of application No. 16/721,012, filed on Dec. 19, 2019, now Pat. No. 10,985,834, which is a (Continued)

(51) Int. Cl.
*H04B 7/185* (2006.01)
*H04B 7/01* (2006.01)
(Continued)

(52) U.S. Cl.
CPC ........... *H04B 7/18532* (2013.01); *H04B 7/01* (2013.01); *H04B 7/18508* (2013.01);
(Continued)

(58) Field of Classification Search
CPC .... H04B 7/18532; H04B 7/01; H04B 7/2125; H04B 7/18543; H04B 7/18508;
(Continued)

(56) References Cited

U.S. PATENT DOCUMENTS

| | | |
|---|---|---|
| 4,218,654 A | 8/1980 | Ogawa et al. |
| 5,642,355 A | 6/1997 | Smith |

(Continued)

FOREIGN PATENT DOCUMENTS

| | | |
|---|---|---|
| AU | 714923 | 1/2000 |
| CN | 1346219 A | 4/2002 |

(Continued)

OTHER PUBLICATIONS

Meulenberg, Andrew, Rahul Suresh, and Shivram Ramanathan. "LEO-based optical/microwave terrestrial communications." arXiv preprint arXiv:1009.5506 (2010). (Year: 2010).*

(Continued)

*Primary Examiner* — Sharad Rampuria
(74) *Attorney, Agent, or Firm* — Haynes and Boone LLP

(57) ABSTRACT

A multiple-access transceiver handles communications with mobile stations in environments that exceed mobile station design assumptions without necessarily requiring modifications to the mobile stations. One such environment is in Earth orbit. The multiple-access transceiver is adapted to close communications with mobile stations while exceeding mobile station design assumptions, such as greater distance, greater relative motion and/or other conditions commonly found where functionality of a terrestrial transceiver is to be performed by an orbital transceiver. The orbital transceiver might include a data parser that parses a frame data structure, a signal timing module that adjusts timing based on orbit to terrestrial propagation delays, frequency shifters and a programmable radio capable of communicating from the (Continued)

Earth orbit that uses a multiple-access protocol such that the communication is compatible with, or appears to the terrestrial mobile station to be, communication between a terrestrial cellular base station and the terrestrial mobile station.

21 Claims, 21 Drawing Sheets

Related U.S. Application Data continuation of application No. 16/103,719, filed on Aug. 14, 2018, now Pat. No. 10,523,313, which is a continuation of application No. 15/916,909, filed on Mar. 9, 2018, now Pat. No. 10,084,535, which is a continuation-in-part of application No. 15/857,073, filed on Dec. 28, 2017.

(60) Provisional application No. 62/490,298, filed on Apr. 26, 2017.

(51) Int. Cl.
*H04B 7/212* (2006.01)
*H04W 84/06* (2009.01)

(52) U.S. Cl.
CPC ....... *H04B 7/18543* (2013.01); *H04B 7/2125* (2013.01); *H04W 84/06* (2013.01)

(58) Field of Classification Search
CPC ............ H04B 7/18513; H04B 7/18539; H04B 7/18563; H04B 7/2041; H04B 7/216; H04W 84/06
See application file for complete search history.

(56) References Cited

U.S. PATENT DOCUMENTS

| | | | |
|---|---|---|---|
| 5,841,766 A | 11/1998 | Dent et al. | |
| 5,943,324 A | 8/1999 | Ramesh et al. | |
| 5,991,598 A | 11/1999 | Nawata | |
| 6,008,758 A | 12/1999 | Campbell | |
| 6,031,826 A | 2/2000 | Hassan | |
| 6,084,865 A | 7/2000 | Dent | |
| 6,101,177 A | 8/2000 | Bodin et al. | |
| 6,157,621 A | 12/2000 | Brown et al. | |
| 6,404,769 B1 | 6/2002 | Kapoor | |
| 6,493,322 B1 | 12/2002 | Chemmakeshu et al. | |
| 6,553,225 B1 | 4/2003 | Zhao et al. | |
| 6,606,309 B1* | 8/2003 | Wang | H04W 74/0866 370/522 |
| 7,257,371 B1 | 8/2007 | Bettinger et al. | |
| 7,358,899 B1* | 4/2008 | Ville | G01S 11/02 342/458 |
| 7,502,382 B1 | 3/2009 | Liu et al. | |
| 7,515,566 B2 | 4/2009 | Dale et al. | |
| 7,574,224 B2 | 8/2009 | Lane et al. | |
| 8,538,327 B2 | 9/2013 | Sayeed et al. | |
| 8,665,771 B2 | 3/2014 | Nam et al. | |
| 8,705,436 B2 | 4/2014 | Dutta et al. | |
| 9,042,408 B2 | 5/2015 | Gaal et al. | |
| 9,184,629 B2 | 11/2015 | Miller et al. | |
| 9,628,956 B1 | 4/2017 | Kim | |
| 9,788,306 B2 | 10/2017 | Chen et al. | |
| 9,954,601 B2 | 4/2018 | Buer et al. | |
| 9,973,266 B1 | 5/2018 | Avellan et al. | |
| 10,084,535 B1 | 9/2018 | Speidel et al. | |
| 2001/0022779 A1 | 9/2001 | Wheatley et al. | |
| 2002/0060995 A1 | 5/2002 | Cervello et al. | |
| 2002/0151273 A1 | 10/2002 | Marko | |
| 2002/0164986 A1 | 11/2002 | Briand et al. | |
| 2002/0177403 A1 | 11/2002 | LaPadre et al. | |
| 2003/0028339 A1 | 2/2003 | Caso et al. | |
| 2004/0192197 A1 | 9/2004 | Capots et al. | |
| 2004/0192201 A1 | 9/2004 | Febvre et al. | |
| 2006/0246913 A1 | 11/2006 | Merboth et al. | |
| 2007/0078541 A1 | 4/2007 | Rogers | |
| 2007/0184778 A1 | 8/2007 | Mechaley, Jr. | |
| 2008/0143589 A1 | 6/2008 | Dankberg et al. | |
| 2008/0311844 A1 | 12/2008 | Eidenschink | |
| 2010/0220780 A1 | 9/2010 | Peng et al. | |
| 2010/0220782 A1 | 9/2010 | Peng et al. | |
| 2010/0322337 A1 | 12/2010 | Ylitalo et al. | |
| 2011/0013678 A1 | 1/2011 | Smith | |
| 2011/0135043 A1 | 6/2011 | Downey et al. | |
| 2012/0302160 A1 | 11/2012 | Silny et al. | |
| 2016/0037434 A1 | 2/2016 | Gopal et al. | |
| 2016/0080072 A1 | 3/2016 | Baudoin et al. | |
| 2016/0205560 A1 | 7/2016 | Hyslop et al. | |
| 2017/0324465 A1 | 11/2017 | Sotom et al. | |
| 2018/0022474 A1 | 1/2018 | Meek | |
| 2018/0034538 A1 | 2/2018 | Baudoin et al. | |
| 2018/0069651 A1 | 3/2018 | Davydov et al. | |
| 2018/0138968 A1 | 5/2018 | Auer | |
| 2018/0254824 A1 | 9/2018 | Speidel et al. | |
| 2018/0254825 A1 | 9/2018 | Speidel et al. | |
| 2020/0067661 A1* | 2/2020 | Siomina | H04L 5/005 |
| 2020/0244349 A1 | 7/2020 | Speidel et al. | |

FOREIGN PATENT DOCUMENTS

| | | |
|---|---|---|
| CN | 101124742 A | 2/2008 |
| CN | 101166360 A | 4/2008 |
| CN | 102307167 A | 1/2012 |
| CN | 103036607 A | 4/2013 |
| JP | 4207529 | 7/1992 |
| WO | 2009043305 A1 | 4/2009 |
| WO | 2016195813 A2 | 12/2016 |
| WO | 2016209332 A2 | 12/2016 |
| WO | 2017072745 A1 | 5/2017 |
| WO | 2017124004 A1 | 7/2017 |

OTHER PUBLICATIONS

Fletcher et al., "Undersea laser communication with narrow beams," IEEE Communications 1-17 Magazine 53.11 (2015): 49-55. Nov. 9, 2015.
International Search Report issued in PCT Application No. PCT/US2022/011501, dated Apr. 18, 2022.
International Search Report Issued in PCT Application No. PCT/US2018/020205, dated May 17, 2018.
Coulom et al.,"Low Earth Orbit satelitte payload for Personal Communications" 3rd European Conference on Satelitte Communications (ECSC-3), Nov. 2, 1993, 5 Pages.
Radharkrishnan et al., "Survey of Inter-Satelitte Communication for Small Satellite Systems: Physical Layer to Network Layer View" IEEE Communications Surveys & Tutorials 18(4): 2442-2473, May 9, 2016.
Supplemental European Search Report for EPO Application EP 18 76 1611, dated Jun. 28, 2021.
Office Action Issued for Eurasian Patent Application No. 201991901, 5 pages.

* cited by examiner

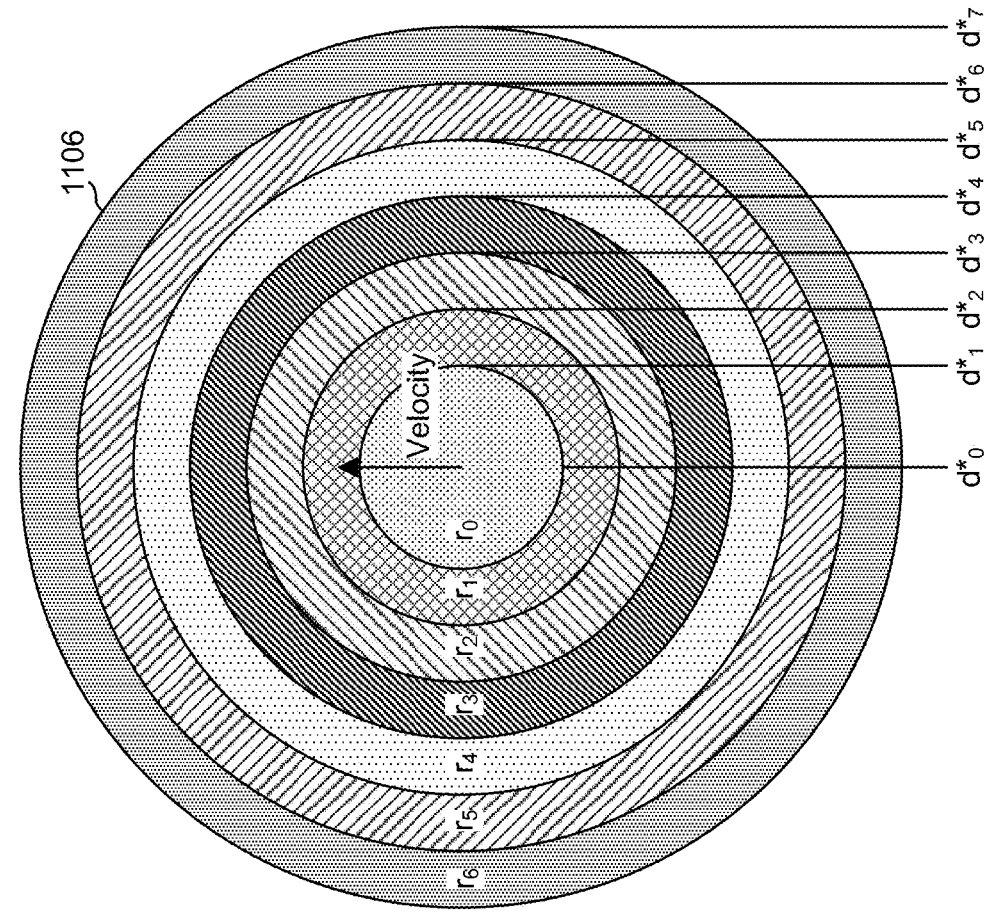
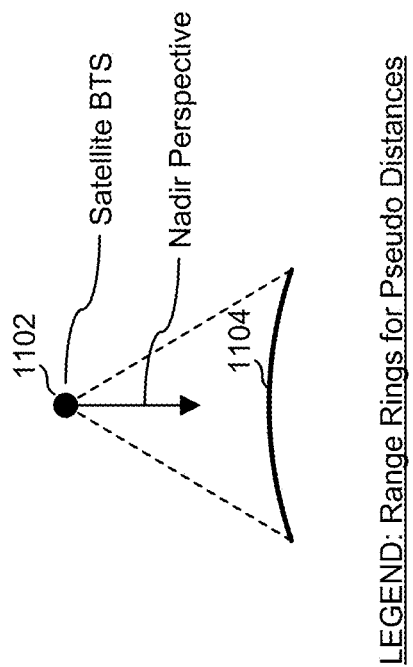
FIG. 11

| Doppler Offset Block | Doppler Shift Strip | Channel Blocks and Pseudo Distance Ranges | | | | | | |
|---|---|---|---|---|---|---|---|---|
| | | b₀<br>r₀ (< 534 km) | b₁<br>r₁ (534 to 569 km) | b₂<br>r₂ (569 to 603 km) | b₃<br>r₃ (603 to 638 km) | b₄<br>r₄ (638 to 672 km) | b₅<br>r₅ (672 to 707 km) | b₆<br>r₆ (> 707 km) |
| $D_{13}$ | > 30 kHz | | | | | | | 70 |
| $D_{12}$ | 25 to 30 kHz | | | | | | 68 | 67 |
| $D_{11}$ | 20 to 25 kHz | | | | | 69 | 64 | 63 |
| $D_{10}$ | 15 to 20 kHz | | | | 66 | 65 | 58 | 57 |
| $D_9$ | 10 to 15 kHz | | 62 | 61 | 60 | 59 | 51 | 50 |
| $D_8$ | 5 to 10 kHz | 56 | 55 | 54 | 53 | 52 | 44 | 43 |
| $D_7$ | 0 to 5 kHz | 49 | 48 | 47 | 46 | 45 | 37 | 36 |
| $D_6$ | −5 to 0 kHz | 42 | 41 | 40 | 39 | 38 | 30 | 29 |
| $D_5$ | −10 to −5 kHz | 35 | 34 | 33 | 32 | 31 | 23 | 22 |
| $D_4$ | −15 to −10 kHz | 28 | 27 | 26 | 25 | 24 | 16 | 15 |
| $D_3$ | −20 to −15 kHz | 21 | 20 | 19 | 18 | 17 | 10 | 9 |
| $D_2$ | −25 to −20 kHz | | 14 | 13 | 12 | 11 | 6 | 5 |
| $D_1$ | −30 to −25 kHz | | | | 8 | 7 | 3 | 2 |
| $D_0$ | < −30 kHz | | | | | 4 | | 1 |

FIG. 18

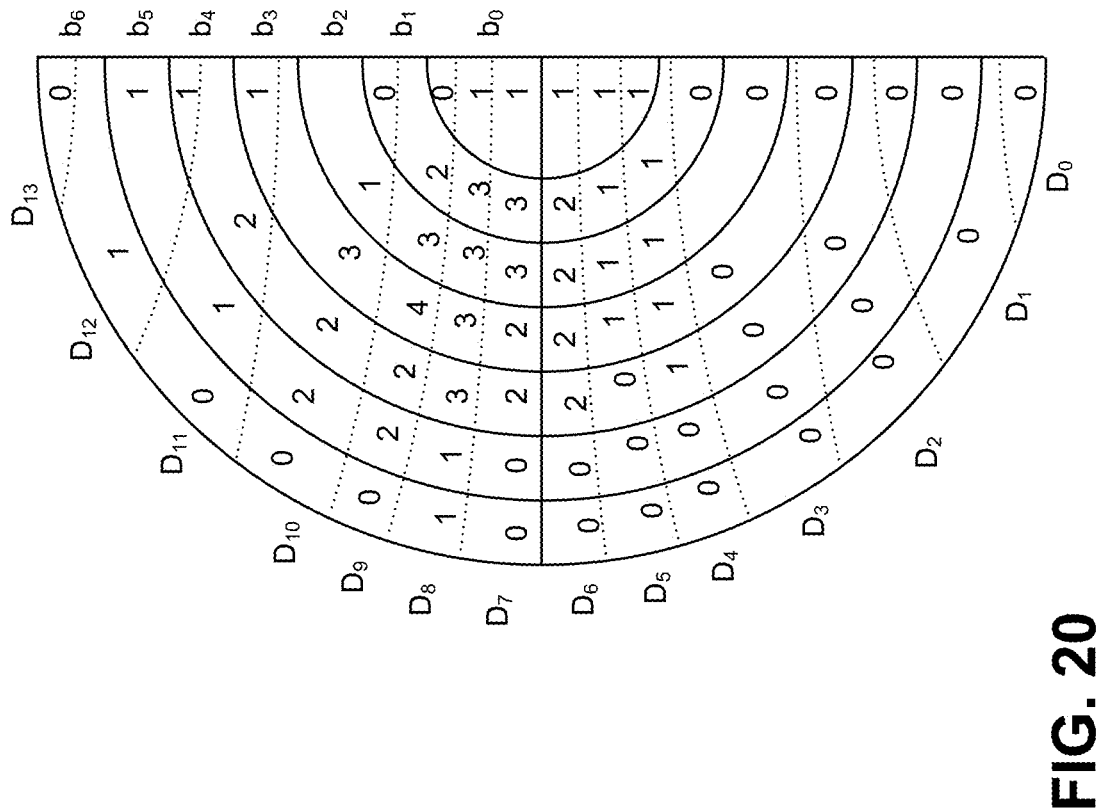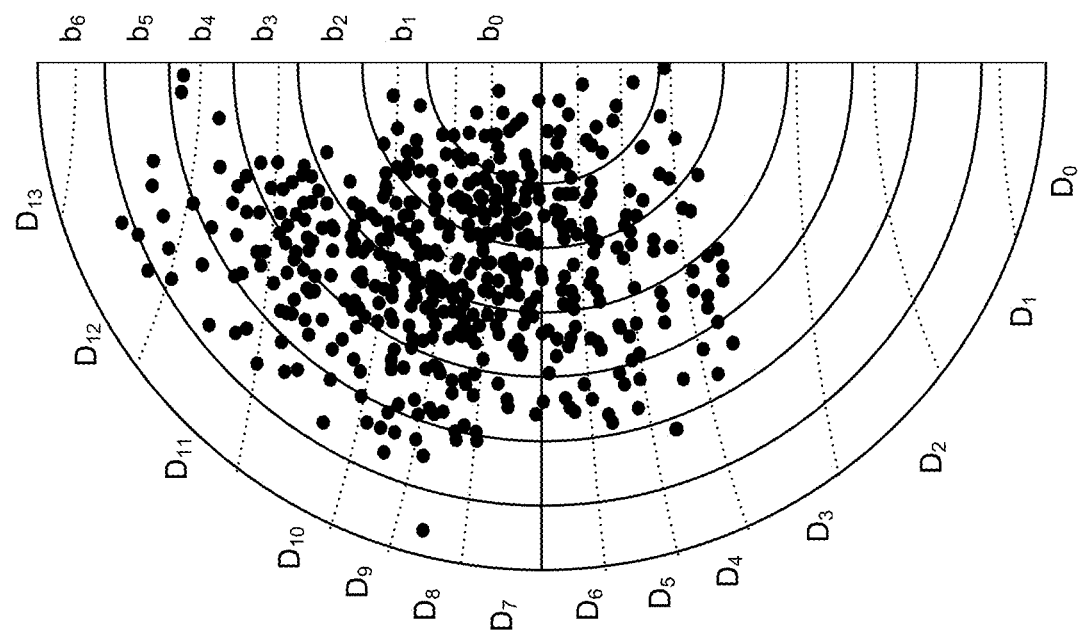
FIG. 20

| Doppler Offset Block | Doppler Shift Strip | Channel Blocks and Pseudo Distance Ranges | | | | | | |
|---|---|---|---|---|---|---|---|---|
| | | $b_0$ (< 534 km) $r_0$ (< 534 km) | $b_1$ (534 to 569 km) $r_1$ (534 to 569 km) | $b_2$ (569 to 603 km) $r_2$ (569 to 603 km) | $b_3$ (603 to 638 km) $r_3$ (603 to 638 km) | $b_4$ (638 to 672 km) $r_4$ (638 to 672 km) | $b_5$ (672 to 707 km) $r_5$ (672 to 707 km) | $b_6$ (> 707 km) $r_6$ (> 707 km) |
| $D_{13}$ | > 30 kHz | | | | | | | |
| $D_{12}$ | 25 to 30 kHz | | | | | 70 | 69 | 68 |
| $D_{11}$ | 20 to 25 kHz | | | | 67 | 65-66 | 64 | |
| $D_{10}$ | 15 to 20 kHz | | | 63 | 61-62 | 59-60 | 57-58 | |
| $D_9$ | 10 to 15 kHz | | 55-56 | 52-54 | 48-51 | 46-47 | 44-45 | |
| $D_8$ | 5 to 10 kHz | 43 | 40-42 | 37-39 | 34-36 | 31-33 | 30 | 29 |
| $D_7$ | 0 to 5 kHz | 28 | 25-27 | 22-24 | 20-21 | 19-20 | | |
| $D_6$ | -5 to 0 kHz | 18 | 16-17 | 14-15 | 12-13 | 10-11 | | |
| $D_5$ | -10 to -5 kHz | 9 | 8 | 7 | 6 | | | |
| $D_4$ | -15 to -10 kHz | 5 | 4 | 3 | 2 | 1 | | |
| $D_3$ | -20 to -15 kHz | | | | | | | |
| $D_2$ | -25 to -20 kHz | | | | | | | |
| $D_1$ | -30 to -25 kHz | | | | | | | |
| $D_0$ | < -30 kHz | | | | | | | |

FIG. 21

METHOD AND APPARATUS FOR HANDLING COMMUNICATIONS BETWEEN SPACECRAFT OPERATING IN AN ORBITAL ENVIRONMENT AND TERRESTRIAL TELECOMMUNICATIONS DEVICES THAT USE TERRESTRIAL BASE STATION COMMUNICATIONS

FIELD OF THE INVENTION

The present invention relates to a method and apparatus for handling communications between spacecraft and terrestrial telecommunications devices, more particularly to communications using features and facilities of the terrestrial telecommunications devices that are typically used for terrestrial telecommunications.

CROSS-REFERENCES TO PRIORITY AND RELATED APPLICATIONS

This application claims priority from and is a Continuation of U.S. Non-Provisional application Ser. No. 16/721,012 filed on Dec. 19, 2019, entitled, "Method and Apparatus for Handling Communications Between Spacecraft Operating In An Orbital Environment and Terrestrial Telecommunications Devices That Use Terrestrial Base Station Communications," which is a Continuation of U.S. Non-Provisional application Ser. No. 16/103,719, filed on Aug. 14, 2018, entitled "Method and Apparatus for Handling Communications Between Spacecraft Operating In An Orbital Environment and Terrestrial Telecommunications Devices That Use Terrestrial Base Station Communications," which is a Continuation of U.S. Non-Provisional application Ser. No. 15/916,909, filed on Mar. 9, 2018, entitled "Method and Apparatus for Handling Communications Between Spacecraft Operating In An Orbital Environment and Terrestrial Telecommunications Devices That Use Terrestrial Base Station Communications," which is a Continuation-In-Part of U.S. Non-Provisional application Ser. No. 15/857,073, filed on Dec. 28, 2017, entitled "Method and Apparatus for Handling Communications Between Spacecraft Operating In An Orbital Environment and Terrestrial Telecommunications Devices That Use Terrestrial Base Station Communications," which claims the benefit of U.S. Provisional patent application Ser. No. 62/490,298 filed Apr. 26, 2017 entitled "Method for Communications Between Base Stations Operating in an Orbital Environment and Ground-Based Telecommunications Devices."

This application also claims the benefit of U.S. Provisional Patent Application No. 62/465,945, filed Mar. 2, 2017 entitled "Method for Low-Cost and Low-Complexity Inter-Satellite Link Communications within a Satellite Constellation Network for Near Real-Time, Continuous, and Global Connectivity" and claims priority to U.S. patent application Ser. No. 15/910,959, filed Mar. 2, 2018, entitled "Simplified Inter-Satellite Link Communications Using Orbital Plane Crossing to Optimize Inter-Satellite Data Transfers."

The entire disclosures of applications recited above are hereby incorporated by reference, as if set forth in full in this document, for all purposes.

BACKGROUND

Mobile communication involves signals being sent between a mobile station (MS) and a transceiver that can provide an interface for the MS to communicate to and from other network resources, such as telecommunication networks, the Internet, and the like, to carry voice and data communications, possibly also location-finding features. The transceiver might be a component in a base transceiver station (BTS) that handles traffic from multiple transceivers. The BTS might also include antennas and encryption/decryption elements. The antennas might be selective antennas, wherein different MSs at different locations might communicate to their respective transceivers via different antennas of the BTS. The BTS may have a wired, wireless, and/or optical channel to communicate with those other network resources. A BTS might support one or more transceivers and a given base station for supporting mobile communication might have a base station controller (BSC) that controls one or more BTS of that base station.

Examples of mobile stations include mobile phones, cellular phones, smartphones, and other devices equipped to communicate with a particular BTS. While herein the mobile stations are referred to by that name, it should be understood that an operation, function or characteristic of a mobile station might also be that of a station that is effectively or functionally a mobile station, but is not at present mobile. In some examples, the mobile station might be considered instead a portable station that can be moved from place to place but in operation is stationary, such as a laptop computer with several connected peripherals and having a cellular connection, or the mobile station might be stationary, such as a cellular device that is embedded in a mounted home security system. All that is required is that the mobile station be able to, or be configured to, communicate using a mobile communication infrastructure.

A BTS might be controlled by a parent BSC via a base station control function (BCF). Each of these elements could be implemented using hardware and/or software and include network management and maintenance functionality, but a base station can be described as having one or more transceiver that communicate with mobile stations according to an agreed-upon protocol. This can be by having the BTS being configured, adapted or programmed to operate according to the agreed-upon protocol for a BTS and having the MS being configured, adapted or programmed to operate according to the agreed-upon protocol for a MS. The protocol might include details of how to send data between a transceiver and a MS, how to handle errors, how to handle encryption, and how to send control instructions and status data between the BTS and the MSs. For example, parts of the protocol might include interactions wherein an MS contacts a BTS and the BTS indicates to the MS what timing, carrier frequency, and other protocol options the MS is to use. This interaction might include carrying voice data, carrying text data, carrying other data, providing for intracell handover and other tasks.

For simplicity of explanation, in many examples herein, communications is described as being between a BTS and a MS for interactions with one MS, but it should be understood that the interactions might be from a BTS to a transceiver, to a radio circuit, to an antenna, to a MS antenna, an MS radio circuit, to software/hardware in the MS, and a corresponding path in the other direction from the MS to the BTS. Thus, in some examples where a BTS is communicating with an MS, it is via a transceiver and the example ignores mention of the other transceivers that the BTS might be controlling.

Examples of protocols that a BTS might use includes GSM (Global System for Mobile Communications; trademarked by the GSM Association) 2G+ protocols with Gaussian minimum-shift keying (GMSK), EDGE protocols with GMSK and 8-PSK keying. A BTS might handle multiple transceivers that use multiple sets of carrier frequencies within a spectrum band of wireless spectrum that the protocol allows for. Thus, where a spectrum band is logically divided into carrier frequency spectra, a transceiver might use channels that use one (or more) of those carrier frequencies to communicate with an MS. The protocol might specify that for a given channel, there is an uplink subchannel and a downlink subchannel, possibly separated in carrier frequency from each other. In some cases, the uplink subchannel has a carrier frequency adjacent to that of the downlink subchannel. In some cases, all the uplink subchannels are in one spectrum band and all the downlink subchannels are in another spectrum band. For ease of explanation, sometimes a channel is described as having an uplink portion and a downlink portion as if it were one channel, even if the portions are widely separated in carrier frequency.

Some BTSs might provide for frequency hopping, where the transceivers and the mobile stations rapidly jump together from carrier frequency to carrier frequency to improve overall BTS performance. The protocol might specify the hopping sequences to use.

In the GSM protocol, transceiver-MS communication involves frames and each frame has up to eight timeslots. With eight timeslots, a transceiver sends out a frame that is directed at up to eight MSs, with each MS assigned a unique timeslot in the frame by the transceiver's BTS. The MSs can send their transmissions in their allotted timeslot and since each MS that is communicating with that transceiver knows which timeslot they are to use, similarly situated MSs can communicate back to the transceiver in their allotted timeslot. A transceiver might not use all eight timeslots.

A signaling channel, such as the GSM protocol's Common Control Channel (CCCH) might be used to convey to the MSs what their allocations are for timeslots and carrier frequencies. For example, some Common Control Channels are used to make access requests (e.g., making RACH requests, which are from a MS to a BTS), for paging (e.g., making PCH requests, which are from a BTS to a MS), for access grant (e.g., an AGCH, which is from a BTS to a MS), and cell broadcast (e.g., CBCH, which is from a BTS to a MS). The AGCH (Access Grant Channel) is used for granting timeslot allocations/carrier allocations. Another channel, the Broadcast Control Channel (BCCH) might or might not be used to send information to the MS, such as Location Area Identity (LAI), a list of neighboring cells that should be monitored by the MS, a list of frequencies used in the cell, cell identity, power control indicator, whether DTX is permitted, and access control (i.e., emergency calls, call barring, etc.).

Examples of BTSs include cellular telephone towers, macro-cell transceivers, femto-cell transceivers, picocells (which might have only one transceiver) and the like. BTSs will communicate with MSs wirelessly. Some BTSs have a backhaul (the interface between the BTS and the other network resources) that is wired, such as with a cellular telephone tower, while some might have a wireless backhaul, such as a microwave point-to-point bidirectional communications channel. Thus, a BTS might be any of several different types of electrically powered devices that receives data streams from MSs and processes those and/or forwards them to other network resources, as well as receiving data streams from the other network resources and processing those and/or forwarding them to MSs over the BTS-MS link(s). In this sense, a BTS acts as an access point for the MSs, to allow an MS to access network resources such as a telecommunications network, the Internet, private networks, etc. The access might be used to route voice calls, other calls, texting, data transfer, video, etc.

A telecommunications network behind a BTS might include a network and switching subsystem that determines how to route data to an appropriate BTS and how to route data received from a BTS. The telecommunications network might also have infrastructure to handle circuit connections and packet-based Internet connections, as well as network maintenance support. In any case, the BTS might be configured to use some protocols with MSs and other protocols with the backhaul.

The protocols for communication between MSs and BTSs might be such that they are standardized so that any standard MS can communicate with any BTS, assuming range requirements are met and membership requirements are met (e.g., that the MS has identified itself to the BTS in such a manner that the BTS, or a service that the BTS uses, determines that the MS is a member of an authorized group or otherwise authorized to use the services provided by the BTS. Some example protocols include the GSM protocols, sometimes referred to as 2G (i.e., second generation) network protocols. Other examples include GPRS (General Packet Radio Services), EDGE (Enhanced Data rates for GSM Evolution, or EGPRS), 3G (third-generation 3G UMTS standards developed by the 3GPP body, or fourth-generation (4G) LTE Advanced protocols.

In these protocols, there are rules for spectrum band use, timing, encoding and conflict resolution. As a BTS is likely to have to communicate with many MSs at the same time, the available wireless communication pathway is divided up according to the protocol. A given protocol might have the available wireless communication pathway divided up by frequency, time, code or more than one of those. This allows multiple users to share the same wireless communication pathway.

For example, with a Time Division Multiple Access (TDMA), the BTS and the multiple MSs agree on the division of time periods into timeslots (or "burst periods") and where a first MS might interfere with a second MS, the first MS is assigned a first timeslot and the second MS is assigned a different timeslot of the available timeslots. Since different MSs use different timeslots (and they all agree on timing sufficiently well), they can share a common carrier frequency and their respective transmissions do not interfere. An example would be where there are eight timeslots of 576.92 µs (microseconds) each for each frame and so an MS assigned the first timeslot will perhaps transmit a number of bits during the first timeslot, stop transmitting at or before the end of its timeslot, remain silent, then during the first timeslot of the next period, continue transmitting, if desired. Similar allocations occur for a MS to determine when it is to listen for something from a BTS (and for the BTS to determine when it is to start transmitting that data).

Thus, using a single carrier frequency, each transceiver of a BTS can communicate with up to eight MSs and communications to those MSs is grouped into a TDMA frame and transmitted on the downlink channels that use that carrier frequency channel. The timing is such that each of those MSs can communicate in their respective timeslots to the BTS on the uplink channels that use that carrier frequency channel. This is referred to as a "TDMA frame" and the data rate over all eight MSs using that carrier frequency is 270.833 kilobits/second (kbit/s), and the TDMA frame duration, in either direction, is 4.615 milliseconds (ms).

Frequency Division Multiple Access (FDMA) is another way to divide up and allocate the available wireless communication pathway. With FDMA, the spectrum bandwidth available or allocated for the wireless communication pathway is divided up into different channels by carrier frequency. A first MS might be assigned one carrier frequency and a second MS might be assigned another carrier frequency, so that both can send or receive to or from one BTS simultaneously.

In the above examples, a plurality of mobile stations communicate with a BTS perhaps simultaneously, wherein communication between the BTS and a specific MS comprises sending information in a signal from the specific MS or from the BTS such that collisions of wireless signals are avoided, by having the BTS and the specific MS agree on which timeslot of a plurality of timeslots is to be used (TDMA), and/or agree on which carrier frequency of a plurality of carrier frequencies is to be used (FDMA). These are examples of multiple-access communications.

In another type of multiple-access communication, called "Orthogonal Frequency Division Multiple Access" (OFDMA), mobile devices are assigned subsets of subcarriers, where orthogonal narrow frequency subchannels are assigned to mobile devices for more efficient use of allotted spectrum compared to FDMA.

In some frequency allocations, the allocation is per channel block, where a channel block is a set, or group, of bidirectional channels, wherein each bidirectional channel uses an uplink carrier frequency for an uplink subchannel and a downlink carrier frequency for a downlink subchannel. The channels might be grouped together into sets of two or more channels based on some logic for classification such that each set shares a common identifier or attribute.

In some protocols, the spectrum is divided into subspectra for carrier frequencies and also the periods are divided into timeslots. Typically, the BTS includes logic to determine which channels to allocate to which MSs. In assigning a channel for use by a MS, the BTS might assign a particular transceiver to use a particular carrier frequency and indicating to an MS that it is to use that particular carrier frequency and also indicate which timeslot to use from a frame transmitted/received using that carrier frequency. The channel might comprise an uplink subchannel and a downlink subchannel. It may be that a given transceiver-MS communication uses more than one channel, e.g., more than one carrier frequency and/or more than one timeslot, but in many examples herein, the protocol is illustrated as being with respect to a MS that uses a channel comprising just one carrier frequency and just one timeslot.

In yet another example of multiple-access communications, called "Code Division Multiple Access" (CDMA), mobile devices might use the same timeslot and carrier frequency, but each mobile device is assigned a unique pseudorandom code to encode the signals to and from the BTS such that even when MSs simultaneously transmit using the same carrier frequency, or almost the same time, and/or the same timeslots, if those are used, applying the unique CMDA code allows for multiple transmitters to occupy the same time and frequency, as the receivers can separate out different receptions by decoding using the pseudorandom codes to decode each specific signal well enough for demodulation.

In effect, CDMA separates the channels not strictly by time or strictly by frequency. The use of CDMA results in a transmission of spread-spectrum signals, spread across a larger bandwidth than without encoding, by using a chipping rate that is faster than the signal bit rate. Thus, encoding signals with pseudorandom codes can replace the timing and frequency elements typically found in TDMA/FDMA protocols, as each code represents some element of articulation in both the time and frequency domain. In CDMA communications, signal propagation delay and timing between the MS and the BTS is understood and so the pseudo-random code is applied to a received signal across some number of bits/chips which, of course, occupy both some discretized span of the time domain and some discretized span of the frequency domain.

In some multiple-access protocols, more than one approach is used.

In GSM protocol digital mobile radiotelephone systems, MSs and BTSs leverage communications across both frequency and time division multiple access (FDMA/TDMA) channels such that MSs can share the same transmit and receive carriers via the assignment of distinct timeslots over each carrier frequency and each carrier frequency might be handled by a distinct transceiver or transceiver module or logic block.

In GSM, the BTS is responsible for assigning a timeslot to the mobile station (MS) when it requests access. In a GSM frame structure, there are eight timeslots within each TDMA frame. The number of carrier frequencies used can vary. In some regions, some carriers are licensed for a large number of carrier frequencies and MSs in those regions are configured to accept instructions to use one of as many as a thousand carrier frequencies (which a BTS would also support). For instance, in Europe the GSM 900 MHz spectrum band comprises 25 MHz of spectrum. If this is logically allocated into 200 kHz carrier frequencies (e.g., a carrier frequency centered within each 200 kHz subspectra band), and transceivers send signals on those carrier frequencies, this provides for 125 carrier frequencies. The use of guard bands (unused carrier frequencies) in the frequency domain might reduce this number, but might provide added reliability or ease of signal processing. Where a TDMA frame allows for eight timeslots, a BTS having sufficient numbers of logical or actual transceivers available, could support 8*125=1000 MSs channels simultaneously. With time division and frequency division, there can be guard slots and guard frequencies, respectively, so that one division has some separation from an adjacent division. With some protocols, more than one timeslot and/or more than one carrier frequency can be assigned to one MS, to provide greater bandwidth.

In some cases, there are multiple BTSs within range of supported MSs and so the support of the MSs can be spread among the BTSs and perhaps they coordinate so that adjacent BTSs avoid using the same carrier frequencies when possible. BTSs might be programmed to spread these frequencies across their towers with a specific re-use scheme. It might also be that a BTS is limited in the number of MSs it can support by the size of the pipe to the other network resources. In one example, a BTS uses from 1 to 15 carrier frequencies (i.e., its transceivers transmit using 1 to 15 carrier frequencies in sending/receiving frames, so it could support anywhere from 8 to 120 simultaneous users.

Each MS typically includes a processor, memory, radio circuitry, a power source, display, input elements and the like to perform its functions. The processor might read from program memory to perform desired functions. For example, the program memory might have instructions for how to form a data stream, how to pass that to the radio circuitry, how to read an internal clock to determine the value of a system clock to appropriately time listening and sending, and how to set appropriate frequencies for transmissions and reception.

Each BTS typically includes a processor, memory, radio circuitry, power source(s), interfaces to the telecommunications network, diagnostic interfaces and the like to perform its functions. The BTS processor might read from program memory to perform desired functions. For example, the program memory might have instructions for how to form a data stream, how to pass that to the radio circuitry, how to communicate with the telecommunications network, how to read an internal clock to determine the value of a system clock to appropriately time listening and sending, how to set appropriate frequencies for transmissions and reception, how to keep track of the various MSs and their state, location, allocation, etc. and perhaps store that into locally available memory.

In the manner described above, an MS will contact a BTS to get allocated some timeslots in frames in some carrier frequencies and the BTS will inform the MS of the MS's allocation. As both the BTS and the MS have the same system clock (or approximately so), they will communicate within their allotted timeslots and carrier frequencies. The assignment and communication of the assignments to the MSs might occur using a random access channel that is used by the MS to request an allocation. In the GSM protocol, this is referred to as a RACH process.

In the example of GSM, communication over the wireless communication pathway is parsed into TDMA frames of duration 4.61538 ms, with eight timeslots per TDMA frame. Each timeslot is long enough to hold 156.25 bits of data. In one application, the MS or BTS will transmit 148 bits of data in a timeslot, over 546.46 μs, with 8.25 bits (30.46 μs) of a guard time between timeslots. In the GSM900 Band, the wireless communication pathway has a bandwidth of 25 MHz in the uplink and downlink directions each, using the spectrum band of 890-915 MHz for uplink subchannels and the spectrum band of 935-960 MHz for downlink subchannels, providing for 125 carrier frequencies (125 carrier frequencies in each direction, spaced 200 kHz apart). With 200 kHz of guard separation on each side of each spectrum band, that leaves 24.6 MHz of spectrum, or 123 carrier frequencies, for moving data. The total capacity of such a wireless communication pathway (in both directions) would then be 156.25 bits per timeslot times eight timeslots per frame times 216.667 frames/second*123 carriers=33.312 Mbits/second.

Given that the MSs can be mobile, they might be some distance from the BTS and that distance might be changing, such as where the MSs is being used to carry on a voice conversation over the telecommunications network while the BTS is fixed to a cellphone tower but the MS is 10 km away and moving at 100 KPH. If the BTS and MS are within a few meters of each other and the MS is not moving, the propagation time of the signals and the Doppler shift due to movement can be ignored. If the MS is moving 100 KPH relative to the BTS, perhaps that can be ignored, but if the MS is some distance away, the propagation time needs to be taken into account or else transmissions in one timeslot will not be received entirely within that timeslot but might arrive late, in the time of another timeslot, which could cause communications losses.

To account for propagation delays, a transmitter will advance or retard the transmission and send bursts of radio frequency (RF) signals to account for propagation delays and a receiver will expect an allocated transmission at an adjusted time. Where there are many MSs and one BTS it is often useful for the MSs to be the ones adjusting their transmission times, so that the place where the timeslots are all aligned is at the BTS. Likewise, the BTS can send its transmissions in the designated timeslots, but the MSs will delay or advance the time at which they listen or expect to receive a transmission, to account for propagation delays. It may be that in addition to the BTS allocating a timeslot or slots and a carrier frequency or carrier frequencies to an MS, the BTS will indicate to the MS what the propagation delay or distance is between the BTS-MS.

For a BTS operating using the GSM protocol, the BTS will know the propagation delay of a MS signal because of how the signal arrives on the RACH (Random Access Control Channel). The RACH channel is an uplink-only timeslot that is used when a MS needs to access a channel to send data. The MS will request channel access by sending a signal burst that is 87 bits long on the RACH. The RACH burst is designed so that there are 69.25 bits of guard period between it and the next timeslot. As a result, the burst can slide within the RACH slot by up to 69.25 bits without ill effects. When the RACH burst arrives at the BTS, the BTS can measure how many of these guard bits the signal burst slipped to the right (i.e., moved out further in time) and thus it can determine the signal's propagation delay. When the BTS responds to the MS with information about its channel assignment, the BTS will include what is called a "timing advance" (TA), which might be expressed as a number of bits that the MS should advance its signal by in order arrive at the BTS within the correct timeslot and not bleed into an adjacent timeslot. In the GSM protocol, the timing advance value can be anywhere between 0 to 63 bits, where 0 bits corresponds to no round-trip propagation delay and 63 bits corresponds to the propagation delay that would be experienced with a MS that is 35 km away from the BTS with the wireless signals traveling at the speed of light.

Without careful timing, transmissions from MSs operating at different distances can arrive at the BTS within the same timeslot and cause collision or overlap. These collisions create interference from the perspective of the BTS, which disrupts the quality and reliability of communications. Guard time (measured in bits and referred to as "guard bits") can be employed to prevent burst timing errors from creating signal collisions, but this can only account for small time alignment errors in internal clocks and cannot account for differences in extended and variable propagation distances.

For example, there might be 30.461 μs of guard time (8.25 guard bits) between timeslots, so that even if a first MS was 4.569 km away from the BTS (9.138 km in round-trip distance) and assigned a first timeslot and a second MS was right near the BTS and assigned the next timeslot, the relative propagation delays of the signals would not result in interference. This is because while the signal from the first MS would be delayed by 30.461 μs, the BTS would receive the later part of the transmission during the guard time, and that transmission would end before the second MS's timeslot began. Often, the guard time is too short to accommodate MSs at all distances they might be found at. For example, if a MS is 10 km (20 km round-trip) away, the propagation delay of a transmission from that MS to the BTS would be delayed by 33.333 μs, which is more than the guard time, so the BTS would be receiving that transmission at the same time as a transmission from another MS that has been assigned the next timeslot.

One solution to accommodate distant MSs sharing the same BTS is to use a timing advance mechanism. The GSM protocol provides for an example of this. In the initial handshake between the MS and the BTS, such as the GSM protocol's uses of a Random Access Channel (RACH) communication, the BTS determines a distance between the MS and the BTS. The BTS might transmit and receive timestamps during a RACH handshake in calculating a distance between the MS and the BTS for each MS is based on an uplink propagation delay.

The determined distance might not be the actual distance between the MS and the BTS, but for many purposes, a pseudo distance is sufficient. As used herein a "pseudo distance" is a value that might or might not be an actual value for a distance, but it is used as a proxy or as the deemed distance, i.e., a module in the MS, the BTS, or elsewhere will assume that value to be the distance and the various components are designed such that using that value works sufficiently well when that value is sufficiently close to the actual value. As an extreme example, suppose an MS and a BTS are 2 meters apart, but there is something in between them that prevents a direct signal and the closest path is a 3 km path that involves numerous reflections. In such a case, the pseudo distance would be 3 km and the MS and BTs would operate assuming that they are separated by 3 km. Since the signal path that their transmissions follow is 3 km, using that as the value for the distance between them works.

In general, a pseudo distance, or pseudo range of distances, that is measured between two objects might differ from their actual distance or range of distances might be measured by determining the time it takes for a radio frequency signal to propagate from one object to the other. Due to signal reflection and multipath, the line of sight distance (or range of distances) between the origin of a signal and its recipient can be slightly different from the propagation distance of that signal, in which case the pseudo distance (or range of pseudo distances) varies from the actual distance (or range of distances). But with consistent use, many operations can work with just value of the pseudo distance. In other uses, "pseudo" might be similarly used to indicate an estimate, assumed, approximate, etc. value.

Once the BTS determines the pseudo distance for an MS, the BTS stores a pseudo distance in a table that the BTS maintains for parameters and variables for each of the active MSs using the transceivers of that BTS. The BTS will communicate that value to the MS in a control message as is described elsewhere herein. The MS then is programmed to implement a "timing advance" wherein the MS considers its copy of the system clock, subtracts a propagation delay corresponding to the pseudo distance and sends its transmission to the BTS earlier than the start of its scheduled timeslot. A RACH process might include various steps as described in further detail below to determine these values.

As used herein, a propagation delay can be calculated from a propagation distance and vice versa, using $c=3*10^8$ m/s as the conversion factor or an approximation thereto. Where there is a standardized bit rate for transmissions, such as 270.833 kbits/s for GSM, the propagation delay or distance can be expressed as a number of bits. For example, a 12 km separation would result in a round-trip propagation delay of 80 µs and with each bit being transmitted over 3.692 µs, the 12 km separation and the propagation delay of 80 µs could be equivalently represented as being a separation or propagation of 22 bits (21.66 to be more precise). Thus, one "bit" of propagation would be equivalent to around 555 meters of round-trip propagation distance and 3.692 µs.

MSs operating at different distances from the BTS will be assigned different timing advances to accommodate their respective communication distances. For convenience, this might be expressed as an integer number of bits. To account for MS movement, this timing advance value, which is communicated to the MS and is used by modules in the MS to determine when to transmit or receive, might be updated periodically and frequently enough to accommodate moving targets that might have a time-variant communication distances relative to the BTS. For example, where a user is using a MS on a high-speed train traveling at 200 KPH, the distance might need to be updated more frequently than if the user is walking on a street.

In the specific example of the GSM protocol, the timing advance is represented as a 6-bit value where the minimum value represents a 0-bit timing advance and the maximum value represents a 63-bit timing advance. Since each bit in the GSM protocol is assumed to correspond to 3.692 µs (and about 555 meters in round-trip propagation delay), 63 bits of timing advance would be used where the pseudo distance is around 555 m/bit*63 bits=34,965 m, or about 35 km. Thus, this timing advance approach would work fine for MSs that are between 0 and 35 km from the BTS. In the GSM protocol, BTS are programmed to, or at least expected to, not respond to requests from a MS if the BTS determines that the MS is further than 35 km from the BTS. This is not a problem when there are other closer BTSs or a distribution of BTSs where all points are within 35 km of one or more BTS.

With a timing advance, the MS sends a transmission before its timeslot begins (from the MS's clock timing) and when it is received at the BTS after a propagation delay, the BTS receives it entirely within its timeslot when the timing advance corresponds to the propagation delay. The MS can correctly do this, because it has been provided a value for how much of a timing advance to use. Note that the actual distance, and therefore the actual propagation delay, might vary from the pseudo distance, but that is often not a problem since the MS-BTS communication has some leeway that is there to handle internal clock differences, transmitter variances, etc.

That timing mechanism works well when there is always one or more BTS within 35 km of any MS, but this might not always be the case. In some geographic regions, it might not be practical, feasible, or economical to have BTSs no more than 35 km from any point in the region. For example, in rural, remote, or island geographic regions, BTS infrastructure with such spacing might leave BTSs unused or unable to be installed or obtain electrical power, as the terrain might be inaccessible and users with MSs might be sparse and widespread. In such situations, an "extended range" mechanism might be used. The GSM protocol allows for such a mechanism.

With an extended range mechanism, each MS is assigned two consecutive timeslots instead of one, so an MS can communicate with a BTS without needing any timing advance, as the transmission can be delayed at the BTS by as much as the duration of one timeslot. While this increases allowed MS-BTS distance (e.g., from 35 km to 120 km), it decreases throughput by half, as there would be only four assignable timeslots available in each TDMA frame instead of eight. This might not be a concern in rural, remote, or island areas, if data rates are low. By using a combination of the timing advance mechanism and the extended range mechanism, the maximum allowed MS-BTS could be 35 km+85 km=120 km.

With the extended range mechanism, each MS is allotted an entire timeslot as an additional guard period, which reduces the throughput by half. A variation of this is the "sorted extended range mechanism" similar to that shown in, for example, U.S. Pat. No. 5,642,355. With the sorted extended range mechanism, timeslots are "consumed" to be used as guard bits, but the timeslots are assigned to MSs by distance, with the closest MS getting the first timeslot and the furthest MS getting the last timeslot that is allotted to an MS, i.e., before any "consumed" timeslots that are not assigned to any MSs. The consumed timeslots are used for guard bits that are needed since the extended range of the MSs will spread out the transmissions. In effect, this "divides up" unused timeslots between the bursts.

If there is more than an 85 km gap, or for other reasons, a "ring extended range" mechanism might be used. With the ring extended range mechanism, a fixed minimum distance is assumed, the timing at the BTS is adjusted by that fixed minimum distance, and a MS that is closer than the minimum communication distance is not supported, as the BTS assumes that all MSs are at least that distance away. This is similar to the approach shown in U.S. Pat. No. 6,101,177. The 35 km range obtained using the timing advance mechanism can be used to support a MS-BTS distance that ranges from the minimum distance to the minimum distance plus 35 km without requiring any MS modifications. In one example, the minimum distance is 85 km, but a different minimum communication distance might be used. In that example, then, the BTS could support an MS that is between 85 km and 120 km from the BTS.

The ring extended range mechanism can be used with 8 of 8 timeslots allocated and can handle MSs with distances that range from 85 km to 120 km from the BTS. However, this creates a physical coverage gap some radius away from the BTS because any signal burst sent from that area will arrive at the BTS too early relative to how the BTS views its timeslots. Instead, the BTS provides coverage for a ring of area. The ring extended range mechanism might be used in geographic areas that have physical gaps, such as lake or valleys, between the BTS and the MSs that it is designed to service, so it would not be a problem to have a region inside the ring where no MSs are supported.

It should be noted that the GSM system employs a TDMA frame offset between uplink and downlink subchannels. In a typical GSM frame structure, the uplink TDMA frame (or MS Tx and BTS Rx) is offset from the Downlink TDMA frame (or BTS Tx and MS Rx) by three timeslots for the purpose of ensuring that the MS does not need to transmit and receive at the same time. It will be clear to those skilled in the art of TDMA communications that this offset between uplink and downlink subchannels is independent of communications over extended distances and is not the same as the timeslot synchronization offset used on the uplink TDMA frame only in the ring extended range mechanism.

If the ring extended range mechanism is combined with the extended range mechanism, this can be used, alone or in combination, to have a BTS coverage that might be over a 120 km radius. These techniques are often sufficient for terrestrial communications, as such communications are typically limited by Earth curvature. For example, to provide line of sight communications between a ground-based MS and a BTS transceiver D distance away, the BTS transceiver should be mounted at a height of at least $h=[SQRT(6370^2+D^2)-6370]$ km. For D=120 km, h=1130 m. As 1,130 meters is higher than any structure built today, tower height is much more of a limiting factor for terrestrial communications than distance and so techniques for extending distance further than say 120 km are not that useful for terrestrial communications for cellular voice, data, text, and similar capabilities, except possibly in selected locations where there are large geologic structures upon which to mount transceivers.

For regions where it is not practical to have base station towers distributed so that there is broad coverage, such as where it is impractical to locate a base station anywhere near some locations, such as within 35 km or 85 km from some location or 120 km where elevated towers can be mounted, satellite communications might be used. Typically, satellite communications is very expensive and thus only used in applications that support the costs, such as resource exploration, explorers, search and rescue, and the like.

Herein, "satellite" refers to an artificial satellite that is launched from Earth with a goal of operating in orbit and/or that operates in orbit whether assembled in whole or part on the ground and/or assembled in whole or part in orbit. A satellite might be assembled and/or operate in one orbit and move to another orbit. The satellite might be propelled or be operating without its own means of propulsion and might or might not rely on other objects in orbit to provide propulsion. As used herein, a satellite when in operation in orbit and not under propulsion is in an orbit that is more or less stable. Such orbits have a minimum distance above the surface of the Earth due to atmospheric drag. There is not a strict dividing line between sufficient vacuum to allow for orbiting and excessive atmosphere that would cause the deorbiting of a satellite, by Low Earth Orbit (LEO) of around 400 to 500 km above the Earth have been shown to be practical, but could be even lower than those altitudes for particularly dense spacecraft such as nanosatellites.

The minimum distance for a practical orbit being so large has traditionally meant that entirely different technologies were employed in satellite communications. In some cases, the ground stations were not mobile and in other cases, they were mobile but required power-intensive, heavy, large and specialized equipment. In addition to distance, movement of the satellite in orbit had to be addressed.

There are many solutions for communications between satellites and ground-based portable handsets on Earth that use that TDMA protocols for communications. Some satellite providers include Iridium™, Globalstar™, Thuraya™, and Inmarsat™ satellite systems, which are based on a uniquely developed satellite phone or user terminal (i.e., a unique hardware device that attaches or connects to an existing mobile phone by a physical or RF connection). With a specific user terminal, the design of the system, the satellite and the terminal can be simplified, as each can be designed specifically to work with the others. The downside is that it requires specific terminal equipment, which would be needed for every end user or small groups of end users, which can be cost-prohibitive and unwieldy. While the custom terminal approach simplifies the system design, as the operator is free to set the details for communication methods, power levels, frequencies, and the like, this ties the users to specific providers. As a result, the end user might need to purchase a satellite phone (or a user terminal that plugs into an existing mobile phone) that costs hundreds to thousands of dollars, is large, has a cumbersome antenna, uses significant power, and has a steep monthly service subscription to operate, and may have to do this for more than one satellite provider. This has limited the appeal of the classic satellite phone market.

As an example, U.S. Pat. No. 8,538,327 describes a modification to user equipment computes a delay measure based on data indicative of the position of a satellite and data indicative of the position of the user equipment. Timing of uplink communication from the user equipment adjusts for that delay when transmitting up to the satellite. The user equipment also computes a frequency offset based on data indicative of the position and velocity of the satellite and adjusts its uplink signal frequency accordingly to account for dynamic Doppler shift in the communications system. This, of course, requires specific user equipment on the ground that is designed for satellite communications.

As another example, U.S. Patent Publication 2006/0246913 describes a method for managing propagation delay of RF signals using sub-coverage rings characterized by reduced difference in round-trip propagation delay differences. This uses a geosynchronous Earth orbit (GEO) satellite to act as a relay to connect a remote mobile station with a base station in its network. To deal with the much greater delays that a GEO satellite introduces, separate processing devices service separate sub-coverage ring, or zone, by configuring itself for that ring's/zone's range of allowable propagation delays. The link between a mobile station and a GEO satellite cannot be closed without the assistance of additional user terminal hardware for power, signal directivity, and frequency manipulation.

What is needed is an improved system for satellite-based communications with portable or mobile devices.

SUMMARY

A multiple-access transceiver for communications with mobile stations in environments handles conditions that exceed mobile station design assumptions without necessarily requiring modifications to the mobile stations, as might be found in Earth orbit. The multiple-access transceiver is adapted to close communications with mobile stations while exceeding mobile station design assumptions, such as greater distance, greater relative motion and/or other conditions commonly found where functionality of a terrestrial transceiver is to be performed by an orbital transceiver. The orbital transceiver might include a data parser that parses a frame data structure, a signal timing module that adjusts timing based on orbit to terrestrial propagation delays, frequency shifters and a programmable radio capable of communicating from the Earth orbit that uses a multiple-access protocol such that the communication is compatible with, or appears to the terrestrial mobile station to be, communication between a terrestrial cellular base station and the terrestrial mobile station.

The multiple-access transceiver might support terrestrial mobile stations that are cellular telephone handsets, smartphones, and/or connected devices. The signal timing module might be adapted to adjust frequency of the transmitted signals based on orbit to terrestrial Doppler shifts. The signal allocation logic might allocate capacity of the multiple-access transceiver to a plurality of terrestrial mobile stations, including the terrestrial mobile station, distributed over a plurality of timeslots, a plurality of carrier frequencies, a plurality of orthogonal subcarriers and/or a plurality of code sequences. The multiple-access transceiver might include a range calculator that determines, for each terrestrial mobile station, a distance from the multiple-access transceiver to the terrestrial mobile station and a signal timing module that determines timing of transmitted signals relative to the frame structure, wherein the frame structure comprises a plurality of slots each having a zero or nonzero timeslot synchronization offset that provides for variable transmission delays that are due to the distance from the multiple-access transceiver to the terrestrial mobile station, and an input signal allocator that allocates a listening timeslot in the frame structure to listen for communications from the terrestrial mobile station where the listening timeslot is timed based on the distance from the multiple-access transceiver to the terrestrial mobile station and the listening timeslot is one of a plurality of timeslots that are variably delayed in the frame structure to account for the multiple-access transceiver handling communications from a plurality of terrestrial mobile stations having a plurality of distances from the multiple-access transceiver.

The multiple-access transceiver might have the plurality of timeslots variably delayed in the frame structure to account for the multiple-access transceiver handling communications from a plurality of terrestrial mobile stations having a plurality of distances from the multiple-access transceiver by assigning each of a plurality of different distance ranges to each of a plurality of channel blocks. The different distance ranges might collectively cover a slant range from a zenith distance through a minimum elevation distance, wherein the zenith distance is a distance between a zenith position of a satellite carrying the multiple-access transceiver relative to a terrestrial mobile station and wherein the minimum elevation distance is a distance between a position of the satellite when the terrestrial mobile station enters a design footprint of the satellite. The different distance ranges might span approximately 34 to 35 kilometers each, with a difference between a zenith distance and a low elevation distance of between 210 and 250 kilometers. The design footprint of a satellite might be a circle, ellipse, rectangle and/or be is independent of, or a function of an antenna and/or antenna beam shape, but in many examples it is approximated as a circle.

A multiple-access transceiver might be adapted for operation in Earth orbit and configured for communication with terrestrial mobile stations, comprising a data parser that parses data received by the multiple-access transceiver according to a frame structure, wherein the frame structure defines which timeslots are allocated to which terrestrial mobile stations, a range calculator that determines, for each terrestrial mobile station, a distance from the multiple-access transceiver to the terrestrial mobile station, a channel assignment module that assigns a plurality of terrestrial mobile stations to a plurality of channel blocks, wherein a channel block has a terrestrial frequency and an orbital frequency offset, a signal timing module that determines timing of transmitted signals relative to the frame structure, and a signal modulator that modulates signals to a terrestrial mobile station at the terrestrial frequency with the orbital frequency offset, wherein the orbital frequency offset at least approximately corresponds with an expected Doppler shift in signals transmitted to the terrestrial mobile station due to relative movement of the multiple-access transceiver and the terrestrial mobile station so that the terrestrial mobile station receives the signal at the terrestrial frequency. The plurality of channel blocks might be allocated based on relative positions of a satellite carrying the multiple-access transceiver and the terrestrial mobile station where the orbital frequency offset varies in small increments, such as 5 kilohertz increments.

In a specific embodiment, a multiple-access base station with one or more transceiver handles communication with a plurality of terrestrial mobile stations, wherein a terrestrial mobile station is configured to expect base station communications with a terrestrial cellular base station that is within a limited distance from the terrestrial mobile station and/or that is moving less than a limited velocity relative to the terrestrial mobile station. The multiple-access base station comprises a data parser that parses data received by the multiple-access base station according to a frame structure, wherein the frame structure defines which timeslots are allocated to which of the plurality of terrestrial mobile stations, wherein the frame structure comprises a plurality of slots each having a zero or nonzero timeslot synchronization offset that provides for variable transmission delays that are due to a distance from the multiple-access base station to the plurality of terrestrial mobile stations; a signal timing module that determines a signal timing adjustment relative to the frame structure for a transmitted signal to the terrestrial mobile station based on a base-to-mobile distance between the multiple-access base station and the terrestrial mobile station where the base-to-mobile distance exceeds the limited distance; and a programmable radio capable of communicating a communication from the multiple-access base station to the terrestrial mobile station using a multiple-access protocol and taking into account the signal timing adjustment, such that the communication is compatible with, or appears to the terrestrial mobile station to be, communication between a terrestrial cellular base station and the terrestrial mobile station, notwithstanding that the base-to-mobile distance exceeds the limited distance.

The multiple-access base station might be adapted to communicate with the plurality of terrestrial mobile stations wherein the plurality of terrestrial mobile stations comprises cellular telephone handsets, smartphones, and/or connected devices. The limited distance might be around 100 kilometers, 120 kilometers or some other distance, with the base-to-mobile distance exceeding that limited distance. The multiple-access protocol might be one of a CDMA-based protocol, an LTE protocol, a GSM protocol, an OFDMA-based protocol, an FDMA-based protocol, a TDMA-based protocol, an EGPRS protocol, or an EDGE protocol. The multiple-access base station might be an orbital base station to be operated in Earth orbit, where the limited distance is 120 kilometers and base-to-mobile distances of terrestrial mobile stations of the plurality of terrestrial mobile stations are from about 500 kilometers to about 750 kilometers. In another variation, multiple-access base station is a base station operable in Earth atmosphere, including being mounted on or in one or more of an airplane, a drone, and/or a balloon, wherein the limited distance is 120 kilometers and the base-to-mobile distance exceeds 120 kilometers.

The multiple-access base station may include signal allocation logic to allocate capacity of the multiple-access base station to the plurality of terrestrial mobile stations, including the terrestrial mobile station, distributed over a plurality of timeslots, a plurality of carrier frequencies, a plurality of orthogonal subcarriers and/or a plurality of code sequences. The programmable radio might be capable of listening for communications from the terrestrial mobile station using a multiple-access protocol and include a range calculator that determines, for each terrestrial mobile station of the plurality of terrestrial mobile stations, its base-to-mobile distance from the multiple-access base station to the terrestrial mobile station; a receive timing module that determines timing of received signals of the terrestrial mobile station relative to the frame structure based on the terrestrial mobile station's base-to-mobile distance; and an input signal allocator that allocates a listening timeslot in the frame structure to listen for communications from the terrestrial mobile station where the listening timeslot is timed based on the terrestrial mobile station's base-to-mobile distance and the listening timeslot is one of a plurality of timeslots that are variably delayed in the frame structure to account for the multiple-access base station handling communications from the plurality of terrestrial mobile stations having a plurality of base-to-mobile distances.

The plurality of timeslots might be variably delayed in the frame structure to account for the plurality of terrestrial mobile stations having a plurality of base-to-mobile distances by assigning each of a plurality of different base-to-mobile distance ranges to each of a plurality of channel blocks. The multiple-access base station can be an orbital base station to be operated in Earth orbit, where the plurality of different base-to-mobile distance ranges collectively cover a slant range from a zenith distance through a minimum elevation distance, wherein the zenith distance is a distance between a zenith position of a satellite carrying the multiple-access base station relative to a terrestrial mobile station and wherein the minimum elevation distance is a distance between a position of the satellite when the terrestrial mobile station enters a design footprint of the satellite.

The different base-to-mobile distance ranges might each span approximately 34 to 35 kilometers with a difference between the zenith distance and the minimum elevation distance is between 210 and 250 kilometers.

The design footprint of the satellite might be a circle, ellipse, rectangle, etc., and might be independent of, or a function of an antenna and/or antenna beam shape.

In some variations, the multiple-access base station having one or more transceiver handles communication with a plurality of terrestrial mobile stations configured to expect base station communications with a terrestrial cellular base station that is within a limited distance from the terrestrial mobile station and/or that is moving less than a limited velocity relative to the terrestrial mobile station. The multiple-access base station comprises a data parser that parses data received by the multiple-access base station according to a frame structure, wherein the frame structure defines which timeslots are allocated to which of the plurality of terrestrial mobile stations, and according to a multiple-access protocol in which the terrestrial mobile station expects to receive signals at a specified frequency and to transmit signals at a specified frequency; a Doppler shift calculator that determines, for each terrestrial mobile station of the plurality of terrestrial mobile stations, its Doppler shift due to velocity of it relative to the multiple-access base station; a channel assignment module that assigns each of the plurality of terrestrial mobile stations to channel blocks in a plurality of channel blocks, wherein each a channel block has a terrestrial frequency and a Doppler frequency offset; a signal modulator that modulates signals to the terrestrial mobile station at the terrestrial frequency with the Doppler frequency offset, wherein the Doppler frequency offset at least approximately corresponds with an expected Doppler shift in signals transmitted to the terrestrial mobile station due to relative movement of the multiple-access base station and the terrestrial mobile station so that the terrestrial mobile station receives the signal at the terrestrial frequency; and a programmable radio capable of receiving a communication from the terrestrial mobile station using the multiple-access protocol and taking into account the Doppler frequency offset of the terrestrial mobile station, such that the communication is compatible with, or appears to the terrestrial mobile station to be, communication between a terrestrial cellular base station and the terrestrial mobile station, notwithstanding that the velocity of the terrestrial mobile station relative to the multiple-access base station exceeds the limited velocity.

The velocity of the terrestrial mobile station relative to the multiple-access base station might be a result of the multiple-access base station being in Earth orbit the Doppler frequency offset might vary in 5 kilohertz increments.

The multiple-access base station might have signal allocation logic to allocate capacity of the multiple-access base station to the plurality of terrestrial mobile stations, including the terrestrial mobile station, distributed over a plurality of timeslots, a plurality of carrier frequencies, a plurality of orthogonal subcarriers and/or a plurality of code sequences.

The multiple-access base station might provide, for each of the plurality of channel blocks, an uplink subchannel and a downlink subchannel, with a contiguous spectrum for uplink subchannels and a contiguous spectrum for downlink subchannels. The channel blocks might be assigned such that adjacent channel blocks are assigned to adjacent Doppler frequency offsets.

In a specific embodiment of a multiple-access base station having one or more transceiver that handles communication with a plurality of terrestrial mobile stations, wherein a terrestrial mobile station is configured to expect base station communications with a terrestrial cellular base station that is within a limited distance from the terrestrial mobile station and/or that is moving less than a limited velocity relative to the terrestrial mobile station, the multiple-access base station might include a data parser that parses data received by the multiple-access base station according to a frame structure, wherein the frame structure defines which timeslots are allocated to which of the plurality of terrestrial mobile stations, wherein the frame structure comprises a plurality of slots each having a zero or nonzero timeslot synchronization offset that provides for variable transmission delays that are due to a distance from the multiple-access base station to the plurality of terrestrial mobile stations and further according to a multiple-access protocol in which the terrestrial mobile station transmits at a expects to receive signals at a specified frequency and to transmit signals at a terrestrial frequency and is received with a Doppler frequency offset, and wherein the multiple-access protocol specifies channel blocks in a plurality of channel blocks wherein each a channel block has a designated terrestrial frequency and a designated timeslot; a signal timing module that determines a signal timing adjustment relative to the frame structure for a transmitted signal to the terrestrial mobile station based on a base-to-mobile distance between the multiple-access base station and the terrestrial mobile station where the base-to-mobile distance exceeds the limited distance, wherein each channel block is assigned a designated signal timing adjustment; a Doppler shift calculator that determines, for each terrestrial mobile station of the plurality of terrestrial mobile stations, its Doppler shift due to velocity of it relative to the multiple-access base station and each channel block is assigned a designated Doppler frequency offset; a dynamic channel allocator that allocates each of the plurality of terrestrial mobile stations to a designated channel block in the plurality of channel blocks based on its designated signal timing adjustment and its designated Doppler frequency offset, with a number of channels in the designated channel block corresponding to a number of the plurality of terrestrial mobile stations that have, or are expected to have, a designated signal timing adjustment and designated Doppler frequency offset; a signal modulator that modulates signals to the terrestrial mobile station at the terrestrial frequency with the Doppler frequency offset, wherein the Doppler frequency offset at least approximately corresponds with an expected Doppler shift in signals transmitted to the terrestrial mobile station due to relative movement of the multiple-access base station and the terrestrial mobile station so that the terrestrial mobile station receives the signal at the terrestrial frequency; and a programmable radio capable of receiving a communication from the terrestrial mobile station using the multiple-access protocol and taking into account the Doppler frequency offset of the terrestrial mobile station, such that the communication is compatible with, or appears to the terrestrial mobile station to be, communication between a terrestrial cellular base station and the terrestrial mobile station, notwithstanding that the base-to-mobile distance exceeds the limited distance and notwithstanding that the velocity of the terrestrial mobile station relative to the multiple-access base station exceeds the limited velocity.

The following detailed description together with the accompanying drawings will provide a better understanding of the nature and advantages of the present invention.

BRIEF DESCRIPTION OF THE DRAWINGS

Various embodiments in accordance with the present disclosure will be described with reference to the drawings, in which:

FIG. 11 illustrates an example of a satellite footprint and the resulting distance ranges within that satellite footprint.

FIG. 18 illustrates an example assignment of the range ring/Doppler shift cells of FIG. 17 to particular carrier frequencies and Doppler offset blocks.

FIG. 20 illustrates an example assignment of cells of a satellite footprint based on anticipated density of MSs by cell.

FIG. 21 illustrates an example channel allocation that might be used for the allocation and mapping illustrated in FIG. 20.

DETAILED DESCRIPTION

Figure 1:
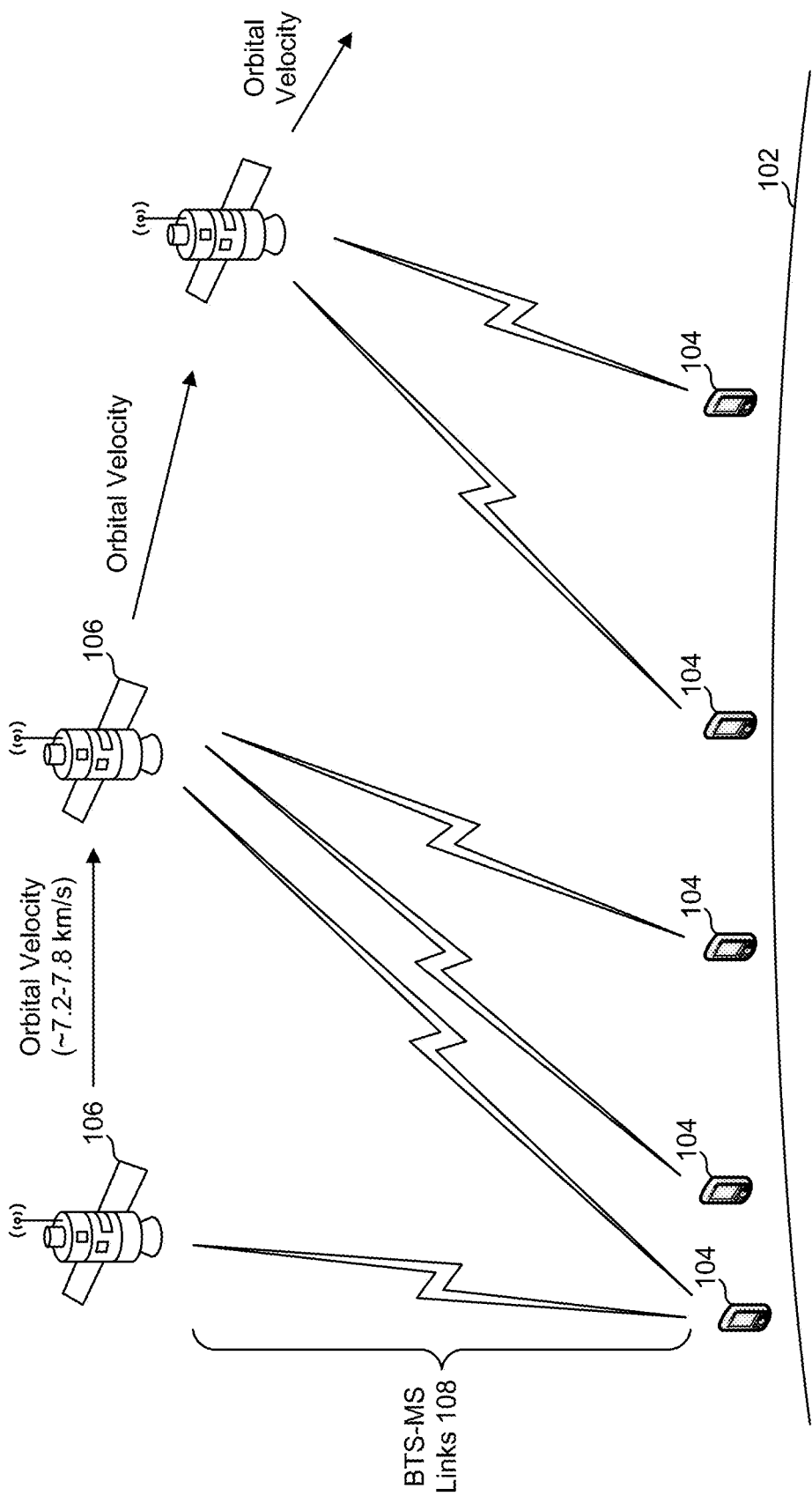
FIG. 1 illustrates an environment in which the present invention might be used.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include designs for a satellite-based base transceiver station (BTS) that is a satellite, or part of a satellite, that can operate in an orbit, and that implements transceivers for transmission and reception between ground-based devices, such as mobile stations (MSs) that are mobile stations designed to be used with terrestrial BTSs. In many cases, the MSs can be used without requiring any physical modifications or even any software modifications, in which case an MS could be communicating with a transceiver and a BTS and not be aware that the BTS is not a terrestrial BTS, or more generally, that the BTS is operating outside of design assumptions for the MSs, such as being at relative distances greater than the design assumption for distance, relative speeds being much greater than the relative speed that the MS would be designed for, and other design assumptions.

With orbital transceivers and terrestrial MSs, the BTS would be outside a design assumption of the MS design that assumes a maximum distance from BTS to MS of, say, around 35 km and would be outside a design assumption of the MS design that assumes that relative motions, such as the time derivative of the BTS-MS distance when communicating, could be ignored or is much smaller than the 7.2-7.8 km/s that would be experienced relative to an orbital transceiver. Other design assumptions might also come into play. For example, an orbital transceiver will have a limited time window in which to communicate, as the satellite rises above a minimum elevation relative to a MS until it sets below the minimum elevation at the opposite horizon.

While most of the examples and details here relate to an orbital transceiver that is adapted, configured, programmed, etc., to close communications with MSs that operate as if those design assumptions still hold true, these techniques can be used beyond just the orbital example. For example, they might be used for BTSs that are located high enough that the slant angle is greater than 120 km. For example, if a BTS is able to be mounted at an altitude of 1,130 meters, that is enough to allow for a line of sight (slant range) to an MS of 120 km or more. Platforms such as airplanes, UAVs, high altitude drones, hot air balloons, high altitude balloons, suborbital vehicles, space planes, mountains, or even some very large towers might be conditions where some or all of these techniques would find utility. It is also worth noting that the techniques described could even be deployed on a ground based BTS but with an antenna pointing to provide services to MSs operating on platforms that create long communication distances (such as in excess of 120 km) and/or high Doppler shift environments, such as greater than around 200 KPH). This might include conditions in which the MS is operating on the ground, in the atmosphere, or in a space environment and the BTS is on the ground and either mobile (e.g., on some vehicle) or perhaps stationary.

These techniques might also find utility where the MS is in orbit and needs to operate as if the design assumptions are true and the BTS is terrestrial and can operate without the design assumptions being true and adjust to accommodate those MSs. For example, a MS might be used in a moving airplane, or perhaps a future space station. A base station tower on the ground with a large enough antenna could perform the operations to close communications with the MS while addressing similar design assumption violations, such as long distances and high Doppler shifts.

The BSC and MSC (including home location register, or HLR, and subscriber handling) functionality might also be supplied in the satellite, or some of the functionality not needed in orbit specifically is implemented terrestrially. The BTS, BSC, and/or MSC functionality might be implemented using conventional off-the-shelf software-defined radios, or commercial-grade (or proprietary) hardware/software, so long as it can be programmed, configured or adapted to perform necessary functions.

A BTS can provide its functionality despite the extended distance between the BTS and the MS that causes power reductions due to distance and time of flight delays due to distance, and also despite the effects of greater relative movement between the BTS and the MS that exceeds typical ground-based relative movements that a MS might make relative to a BTS. The latter causes Doppler shifts and a conventional MS, such as a cellphone, might not be designed to handle as great a Doppler shift as that caused by a satellite moving relative to the MS at perhaps a speed of 7.6 km/s experienced in LEO. Those Doppler shifts would be variable, as it varies with the location of the MS within a satellite's footprint. Locations behind the satellite will see negative Doppler shift, while those in front of the satellite will see positive Doppler shift.

Power levels should be addressed. As an example, the GSM specification calls for mobile phones to surge transmit power to 1 or 2 W (depending on the frequency) when they need to. The mobile phone will do this naturally on the RACH and once it has a channel assigned, the BTS can command it to quiet down if it doesn't need to transmit so "loud". With suitable BTS antenna capability, two watts can be enough transmit power to close the link at a reasonable elevation angle at 500 km altitude using antennas in something like a 50 cm form factor, where the speeds of data transfer are adjusted as needed. For example, an implementation might focus on 2G speeds and narrowband messaging with short data bursts, rather than trying to support data rates such as 4G LTE, although the latter might be possible. In such a manner, lower power levels and higher data rates can still technically be supported by a space-based base station with sufficient antenna technology. However, lower the power levels of the ground devices and faster data rates tend to increase the power requirements and mass requirements for the space segment.

As used herein, "footprint" refers to the area on the ground that is within range to close a communications channel with a BTS on a satellite. In examples herein, circular footprints are used, but it should be understood that the footprints might not be circular and might depend on obscuring factors, shape of the surface of the Earth, atmospheric conditions, etc. In some instances, the footprint is a "design footprint" that is different than an actual footprint. For example, a satellite might actually be able to communicate with a mobile device that is some distance away and thus within the actual footprint of the satellite, but for selectivity, performance, or other reasons, a system that uses that satellite is designed for a different footprint, such as a smaller footprint than the actual footprint, that is the design footprint. A boundary of a design footprint might be the circle or ellipse cast onto the Earth by the satellite centered on the surface point just below the satellite and having a radius that the satellite is supposed to cover by design, such a certain slant range.

As used herein, "ground" is used to refer to the location of an MS, but it should be understood that "ground" is not limited to the surface of the Earth. When an MS is described as being ground-based, or on the ground, it could be in the hands of a person standing on the surface of the Earth, on the surface of a body of water, somewhat below the surface of the Earth or somewhat below the surface of a body of water, in an upper floor of a building, in a structure that is not exactly at ground level, in an airplane or otherwise aloft but in the atmosphere, or similar locations. However, for clarity of exposition, the MS might be described as being on the ground to distinguish from elements being in orbit. This is not to say that the systems described herein would not be usable for an MS that is in orbit. Where applicable, unless otherwise noted, MSs in orbits might also be supported, assuming that the devices are electrically, mechanically, and otherwise, rugged enough for orbital use, even if they are not modified specifically to communicate with a BTS in orbit.

As used herein, "being in orbit" refers to being at a location and travelling at a speed relative to an inertial frame that is stationary (more or less) with respect to the center of gravitation of the Earth and experiences sufficiently little atmospheric drag at that location such that the orbit can be easily maintained. In some examples herein, an orbital distance is given and that refers to, approximately, a typical distance from an average or ordinary point on the surface of the Earth, as is conventional for describing orbits. "LEO" is used in some examples, and it should be understood that the examples might apply to orbits that might be somewhat outside what is conventionally defined as LEO, but still considered to be orbits. Unless otherwise indicated, being in orbit can also describe orbits around other celestial bodies, such a Mars, the Moon, other planetary moons, or even points of interest, such as L1 or L2. In many of the examples herein, the BTS is in orbit around the Earth and the MS is terrestrial. It is possible to use the teachings herein for other situations, such as where the BTS and the MS switch places, or where instead of in Earth orbit, the BTS is in an airplane, an unpiloted autonomous vehicle, a balloon, etc. where similar difficulties are encountered or more generally where condition are present in which difficulties, such as distances, propagation delays, and/or Doppler shifts exceeds what a MS is typically designed to support or experience, e.g., the design assumptions that go into constructing and/or programing an MS.

In a classic TDMA communications system, there are timing and signal power aspects to closing a communication link, i.e., creating conditions where the received signal power is high enough above the noise/interference environment such that data can flow over a channel at a desired data rate and bit error rate and following the expected protocols such that the devices communicating do not give up at either end. As described herein, a satellite-based BTS can communicate with a ground-based MS designed for use with ground-based BTSs. The satellite-based BTS modifies TDMA communications with MSs in a manner that allows for communication over some differential distance by accounting for variable propagation delays while being transparent to the MSs. Being in LEO, a constellation of satellites can provide continuous connection from orbit of 400-500 km above the Earth, with an acceptable economic deployment cost and reasonable service lifetime, to MSs that use conventional terrestrial communications technology and protocols. The BTS provides suitable timing for TDMA frame structures that allows for orbital-range communications and a channel allocation or assignment scheme supporting needed ranges of pseudo distances and Doppler shift mitigation, and deals with signal interference issues and mismatch associated with Doppler shift due to orbital velocities. As a result, a BTS as described herein can provide communications between spacecraft and terrestrial telecommunications devices, and communications using features and facilities of the terrestrial telecommunications devices that are typically used for terrestrial telecommunications. This can extend the range of radio coverage in a communication system to enable communications between on-orbit spacecraft and mobile phones or other communication/wireless devices. The BTS can be used in communications systems that leverage multiple access techniques in the frequency and/or time domain (i.e., TDMA, FDMA, OFDMA, etc.) used with conventional mobile phones to communicate with spacecraft in orbit using the GSM cellular communication protocols or similar terrestrial protocols.

The BTS can be implemented using communication modalities that use a multiple access method in the time and/or frequency domain such as TDMA, FDMA, CDMA, OFDMA, etc. as the BTS handles RF signal sliding in both the time and frequency domains, which need to be dealt with given the distances involved and the relative speeds involved. In general, unless otherwise indicated, the teachings herein can be applied to one or more of these examples of multiple access methods and systems, wherein multiple mobile stations are communicating, or attempting to communicate, with a BTS and to avoid interference, the protocols used provide for multiple access by having the MSs each use different timeslots, carrier frequencies, and/or code sequences. Thus, while many examples are described with reference to TDMA/FDMA protocols, the examples could extend to other protocols.

Herein, distances might be expressed in other than kilometers and in those cases, certain conversions are assumed. For example, the speed of light in vacuum might be a conversion factor where distances are expressed in units of seconds, such as microseconds and milliseconds. The propagation delay in a particular situation might be the speed of light in vacuum or might be longer, but from context it will be apparent to one skilled in the art how to determine a distance given a propagation delay expressed in units of seconds.

Likewise, distances and/or times might be expressed in units of bits and in those cases, a certain bit rate is assumed. For example, for a bit rate of 270.833 kbit/s, a time period expressed as "156.25 bits" would refer to a time period of 576.92 µs and a distance expressed as 10 bits might correspond to a distance of 5.538 km, since transmitting 10 bits would occupy 36.92 µs, and in those 36.92 µs, the signal could travel those 5.538 km (round-trip) at the speed of light in vacuum. The differences between the speed of light in vacuum and the actual propagation speed might differ and that might be taken into account, but for the purposes of illustration, those details might be omitted so as to not complicate the explanations.

Description of an Example BTS and its Operation

The present invention will be described in detail with reference to specific, but not necessarily preferred, embodiments of the invention. These specific embodiments are by way of example and one skilled in the art of multiple access communications systems and the art of orbital mechanics will recognize upon reading this disclosure that other variations are possible and this disclosure is relevant to many types of multiple access communication systems between MSs on the surface of a planetary body, and spacecraft BTSs operating in a variety of orbits around that body.

In many examples herein, the orbit for a satellite including a BTS is given as a circular orbit with an altitude of 500 km, but it should be understood that the teachings herein apply to other orbits, adjusted accordingly. In some examples, the BTS operates as, or simulates the operation of, a GSM BTS or performs enough of the functions to communicate with a terrestrial mobile station (MS) that is near the surface of the Earth, i.e., not in orbit.

In some of the examples herein, the footprint of the satellite is given as the set of points on the surface of the Earth, or near the surface of the Earth for which the satellite is at a minimum elevation angle or greater as seen from a MS. As used herein, when a satellite is directly overhead a MS, the MS "sees" the satellite at an elevation angle of 90 degrees (and thus the MS is in the direction of nadir relative to the satellite). In examples herein, the slant range is from 90 degrees to 40 degrees, but other slant ranges might be used that are greater than or less than that. A person of ordinary skill in the art, after reading this disclosure, would understand how to modify the calculations herein accordingly.

Using a radius of 6370 km for the Earth, and assuming a 500 km circular orbit, a MS within the footprint will be 500 km from the BTS when the elevation angle is 90 degrees. Using basic geometry, it can be determined that, from a point on the Earth's surface, a satellite in a 500 km circular orbit would appear with an elevation of around 40 degrees relative to the horizon at that point when the distance from the satellite to that point is around 741 km. The propagation delay of signals between a MS and a satellite BTS is a function of distance and distance to a satellite in orbit is a function of the orbit radius and the elevation angle, which is the angle between the position vector of the satellite and the position vector of the MS. When the elevation angle is 90 degrees, i.e., the satellite is overhead and the MS is at the surface point in the direction of the nadir of the satellite, the distance can be taken as the difference between the orbital radius and the Earth's radius, or approximately so. When the elevation angle is lower than 90 degrees, the distance can be calculated. For some minimum elevation angle at which a connection is expected to be created, it is generally considered that angle will correspond to the longest supported distance for such connections. With a 40 degree minimum elevation angle, the interaction time between the MS and satellite BTS can be calculated at the BTS and/or MS as follows. For a 40 degree elevation angle and a 500 km circular orbit, the Earth central angle is ACOS(R_earth*COS(min_elev)/(R_earth+h))−min_elev=4.74 degrees, where R_earth=6370 km (the radius of the Earth), min_elev is the minimum elevation angle (40 degrees, in this example), and h is the satellite altitude (500 km, in this example). The time it takes for the MS to go from 40 degrees minimum elevation angle with respect to the satellite on one horizon to 40 degrees minimum elevation angle with respect to the satellite on the other horizon can be computed as the time it takes the satellite to traverse 2*4.74=9.47 degrees of the Earth's surface. As explained herein, a satellite at 500 km circular orbit is moving at 7.11 km/s with respect to the Earth's surface. So the time, in seconds, it takes to traverse 9.47 degrees of the Earth's surface at this velocity is approximately 9.47 degrees*pi/180*(R_earth+h)/7.11 km/s=159.86 seconds. Of course, other minimum elevation angles could be used and the calculations adjusted accordingly. This assumes that the MS traverses directly through the center of the satellite footprint as it passes overhead. In various states, the BTS and/or MS can take this value of 159.86 seconds into account for planning and coordinating communications and scheduling.

The actual distances might be different depending on atmospheric effects and other physical interactions. In this example, the BTS is then configured to support communication with devices that are between around 500 km to 741 km between the BTS and the MS and does need to support MSs if those MSs see the BTS at an elevation of lower than 40 degrees from a local horizon. In some implementations, the lower end is lowered from the orbital distance to allow for communications with MSs that are well above the ground. For example, if the MS is located in an airplane that flies at 15,000 meters but the satellite assumes a minimum distance of 485 km, then that MS could be supported. In another example, a satellite in Geosynchronous Earth Orbit (GEO) could provide the BTS, in which case the minimum distance is around 35,786 km.

FIG. 1 illustrates an environment in which the present invention might be used. As shown there, on the surface 102 of the Earth (or other planetary or celestial body, for that matter) there are several mobile stations (MS) 104 that can be mobile or possibly portable or stationary but functioning as MSs. These MSs 104 communicate with orbital BTSs 106 over BTS-MS links 108. As illustrated, each of the BTSs 106 has an orbital velocity relative to the surface 102, as well as some separation distance.

Figure 2:
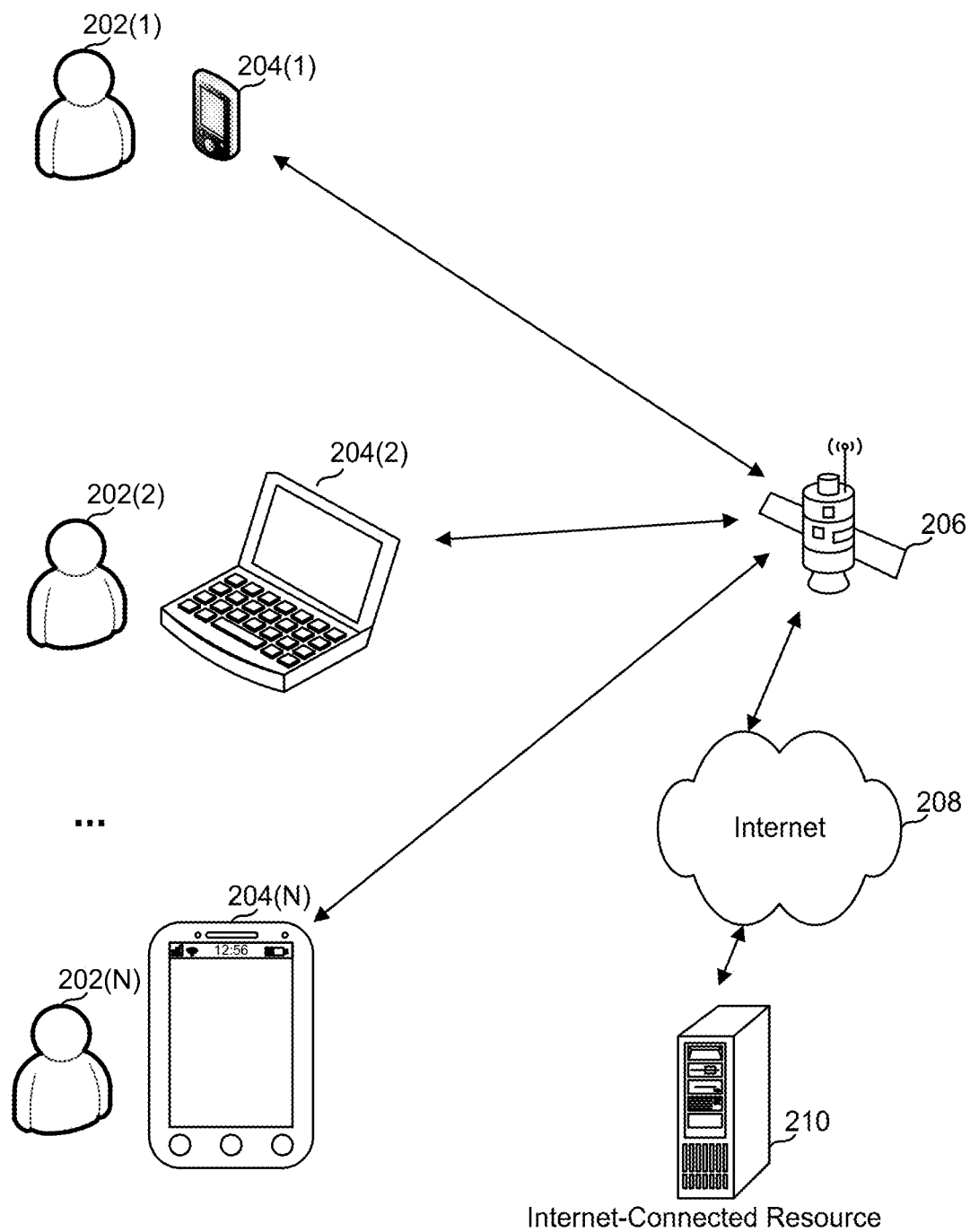
FIG. 2 illustrates additional examples for the environment of FIG. 1.

FIG. 2 illustrates additional examples for the environment of FIG. 1, wherein persons 202 have various devices 204 that include elements that constitute a mobile station, such as a smartphone 204(1), a laptop computer 204(2), and a tablet device 204(N), each of which are configured and/or adapted to communicate with a terrestrial BTS and where persons 202 desire to communicate or access the Internet 208 and/or Internet-connected resources 210, they can do so via BTS 206. Other examples of devices might be user interfaceless devices such as industrial or home equipment that interacts over a network (e.g., "Internet of Things" devices).

Figure 3:
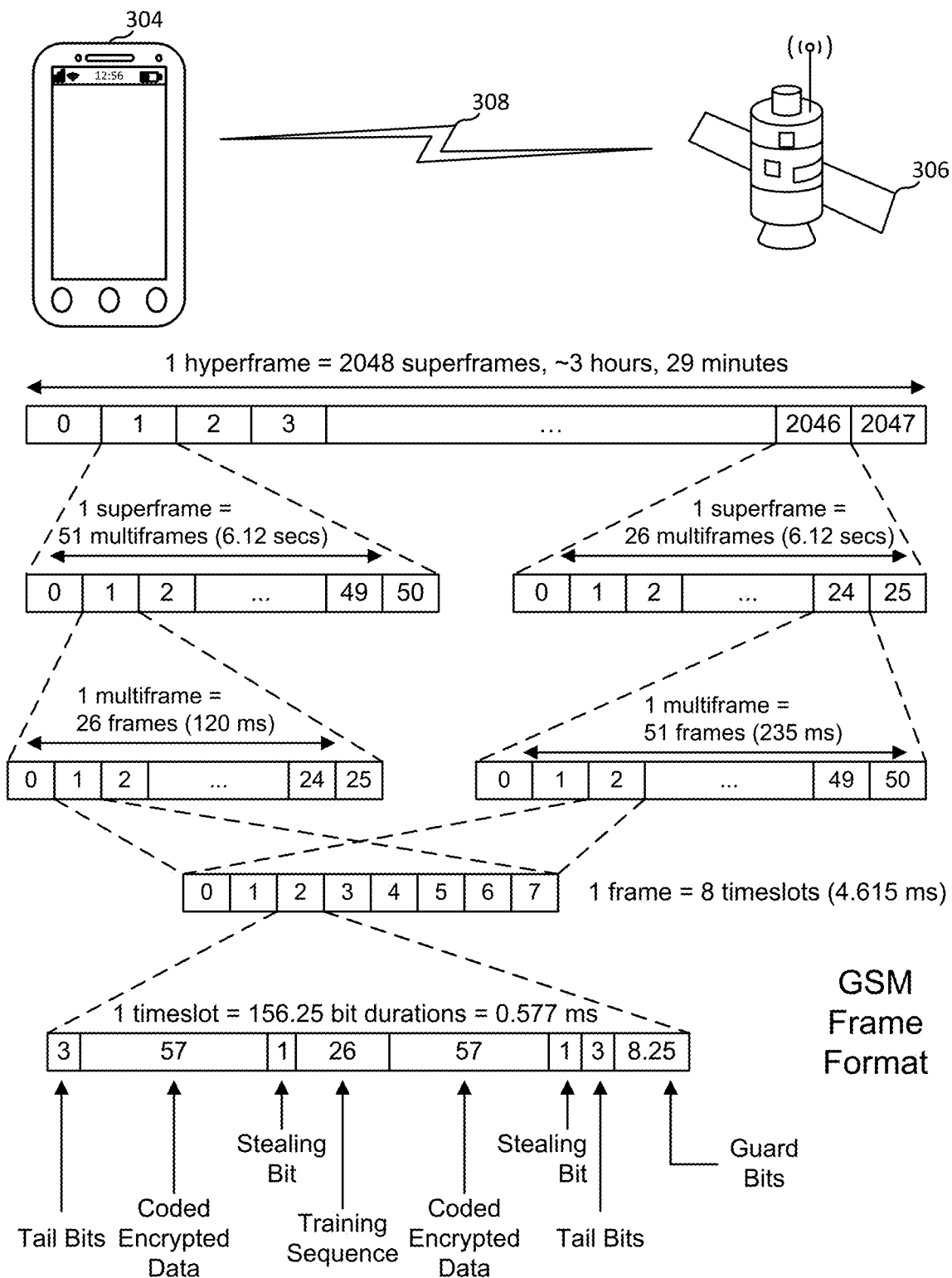
FIG. 3 illustrates an example of a frame-based protocol used between a base transceiver station and a mobile station.

FIG. 3 illustrates an example of a frame-based protocol used between a base transceiver station (BTS) 306 and a mobile station (MS) 304 over a ground-to-orbit link 308 using a protocol such as TDMA or other protocol that might also be used for terrestrial communications.

As will be explained in examples herein, a BTS uses various techniques that allow it to transparently support MSs that are merely configured for terrestrial cellular communications. Several examples will be described, but first some methods for range extension in a TDMA system will be described.

Figure 4:
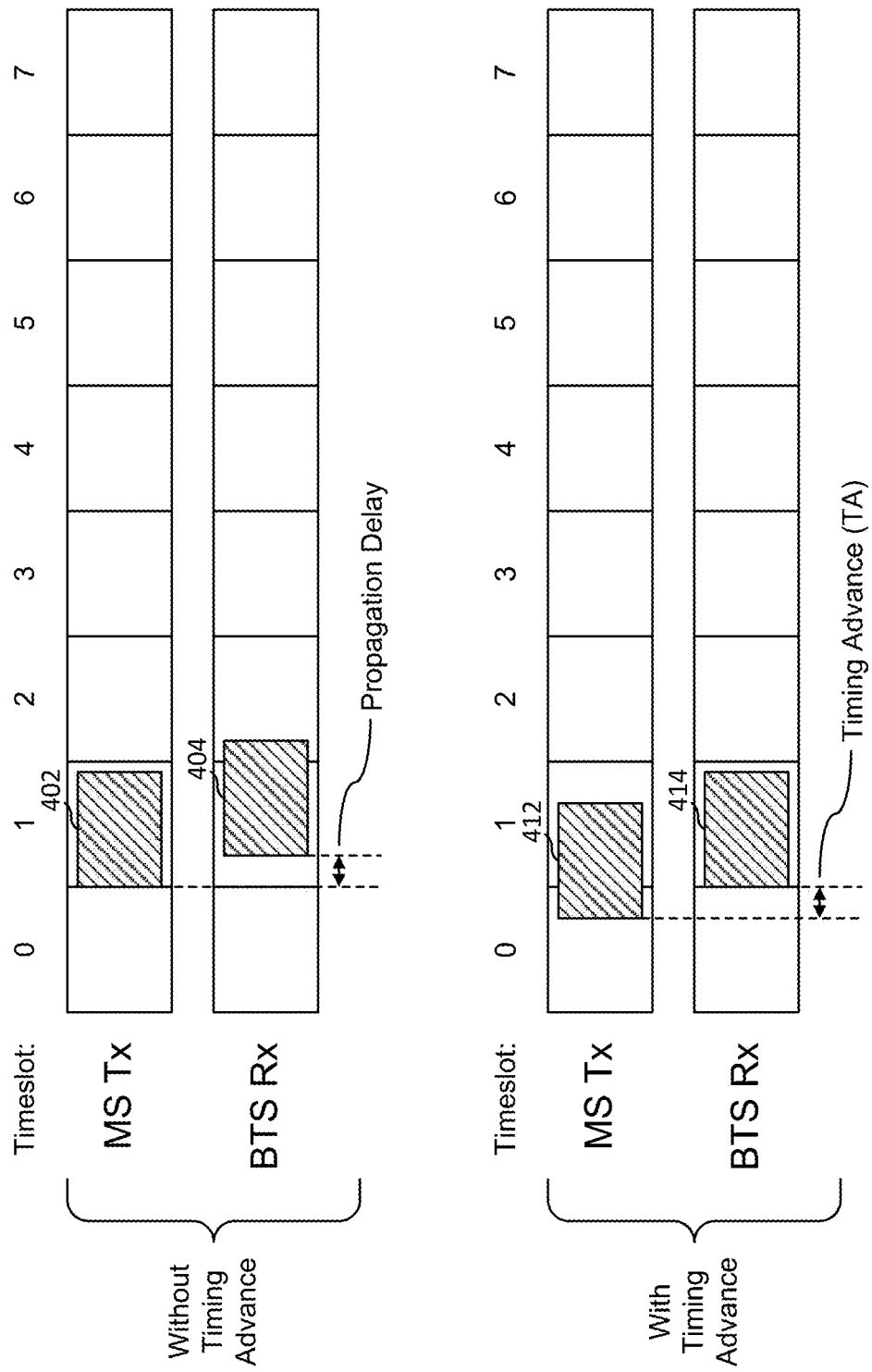
FIG. 4 shows an example of an effect of propagation delay and the use of a timing advance when using a time-division protocol.

FIG. 4 illustrates how the timing advance mechanism might be used. As should be understood, when timing diagrams are shown, it is implied that there are corresponding modules with logic that follow the timing diagram. FIG. 4 also shows effects of propagation delay and the use of a timing advance when using a time-division protocol.

In FIG. 4, eight timeslots of a TDMA frame are shown. These might be part of a larger data structure, which is omitted for clarity of the explanation. If a MS or a BTS has an assigned timeslot for MS-BTS communication, each of the devices are programmed to use their local copy of a system clock to determine when to start transmitting, when to stop transmitting, when to start listening and when it can stop listening, which would correspond to their assigned timeslot.

In FIG. 4, the top line illustrates a transmission 402 from an MS. Herein, "Tx" is an abbreviation for transmission, transmitter, transmitting, as the context might require. Similarly, "Rx" is an abbreviation for reception, receiver, receiving, as the context might require. As used herein, a "transmission" is that which is sent as part of a communication or signal from a transmitter and a "reception" is that which is received. The transmission and its corresponding reception do not occur at the same system time where the transmitter and receiver have the same system time and there is measurable propagation delay. From the perspective of the MS, the process of sending transmission 402 occurs entirely within timeslot 1 and here it is assumed that the MS is assigned timeslot 1. Should the transmission 402 take up most of the allotted timeslot, when it is received at the BTS as BTS Rx after a propagation delay, it will be received as reception 404, which is received in part during timeslot 2. This is undesirable. With a timing advance, the MS sends a transmission 412 before timeslot 1 begins (from the MS's clock timing) and when it is received at the BTS after a propagation delay as reception 414, it will complete entirely within timeslot 1 at the BTS.

Figure 5:
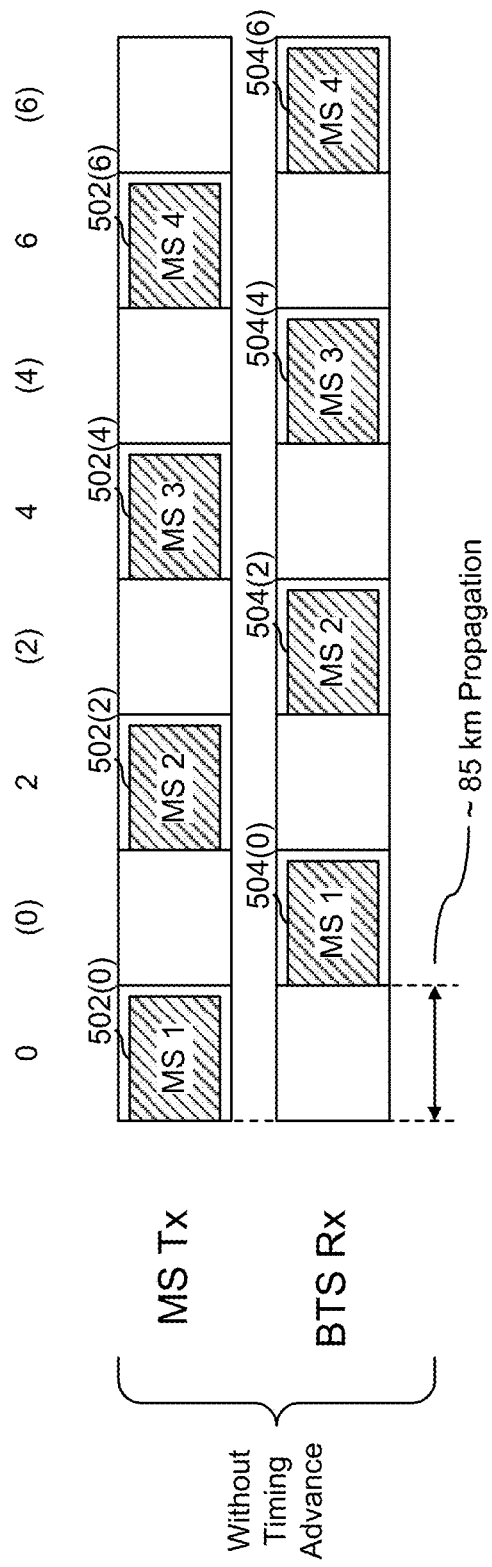
FIG. 5 shows an example of the use of an extended range feature of a time-division protocol.

FIG. 5 shows an example of the use of an extended range feature of a time-division protocol. The duration of a timeslot in this example is around 0.28 milliseconds, representing a distance of 85 km, so an MS can communicate with a BTS without needing any timing advance, as the transmission can be delayed at the BTS by as much as the duration of one timeslot. The extra timeslot serves as an additional guard period.

As illustrated in FIG. 5, at a MS, there are eight timeslots, but only the first (slot 0), third (slot 2), fifth (slot 4), and seventh (slot 6) are used. As illustrated, MS1 makes a transmission 502(0) during timeslot 0, MS2 makes a transmission 502(2) during timeslot 2, MS3 makes a transmission 502(4) during timeslot 4, and MS4 makes a transmission 502(6) during timeslot 6. The BTS receives a reception of such transmissions, receiving a reception 504(0) starting any time after the start of timeslot 0 and ending any time before the end of timeslot 1 (referred to as "(0)" in the figure). Similarly, the BTS receives a reception 504(2) after the start of timeslot 2 and ending any time before the end of timeslot 3 ("(2)"), and likewise for receptions 504(4) and 504(6).

Figure 6:
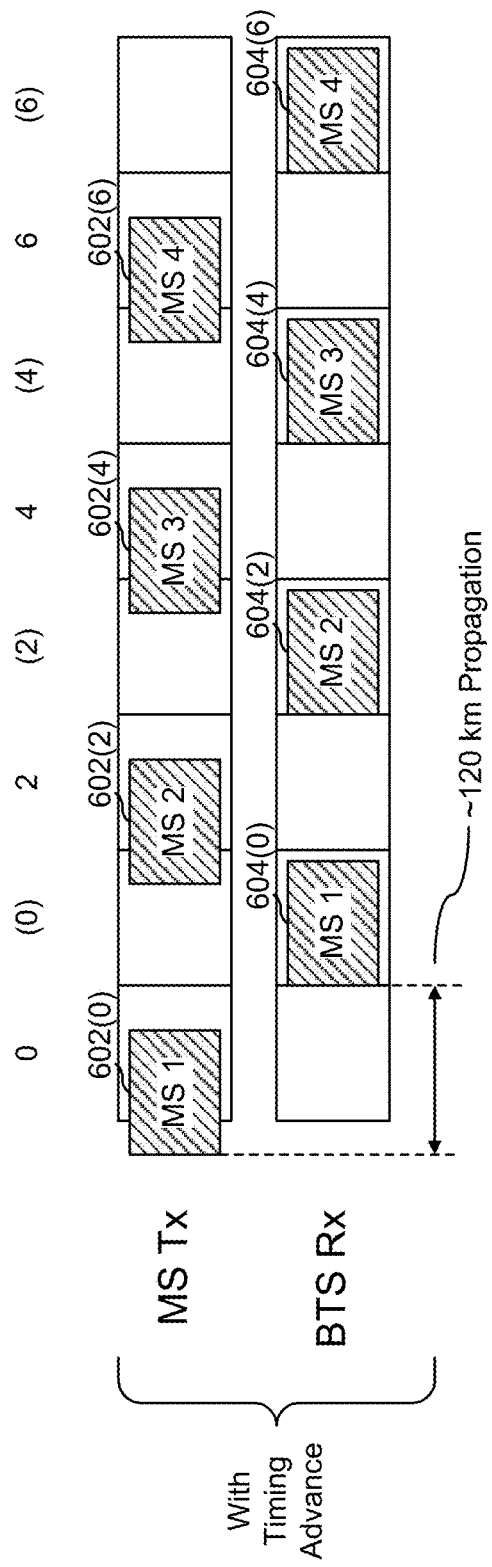
FIG. 6 shows an example of the use of an extended range feature of and timing advance with a time-division protocol.

FIG. 6 shows an example of the use of an extended range feature of and timing advance with a time-division protocol. As shown there, the MS transmissions 602 are during their respective timeslots and the BTS receives such transmissions, receiving receptions 604 at the appropriate time. With a combination of the timing advance mechanism and the extended range mechanism, the maximum allowed MS-BTS could be 35 km+85 km=120 km, as illustrated in FIG. 6. Whether the timing advance mechanism is used alone, the extended range mechanism is used alone, or both are used, the BTS can manage which ones are used. A MS might not even be aware of whether the extended range mechanism is being used, as the BTS would simply not assign every other timeslot. For example, if a BTS determined that a MS was 60 km away, the BTS might tell the MS to use a 0-bit timing advance (i.e., do not use the timing advance) and not assign the next timeslot to any MS. If a BTS determined that a MS was 95 km away, the BTS might tell the MS to use an 18-bit timing advance and not assign the next timeslot to any MS.

Figure 7:
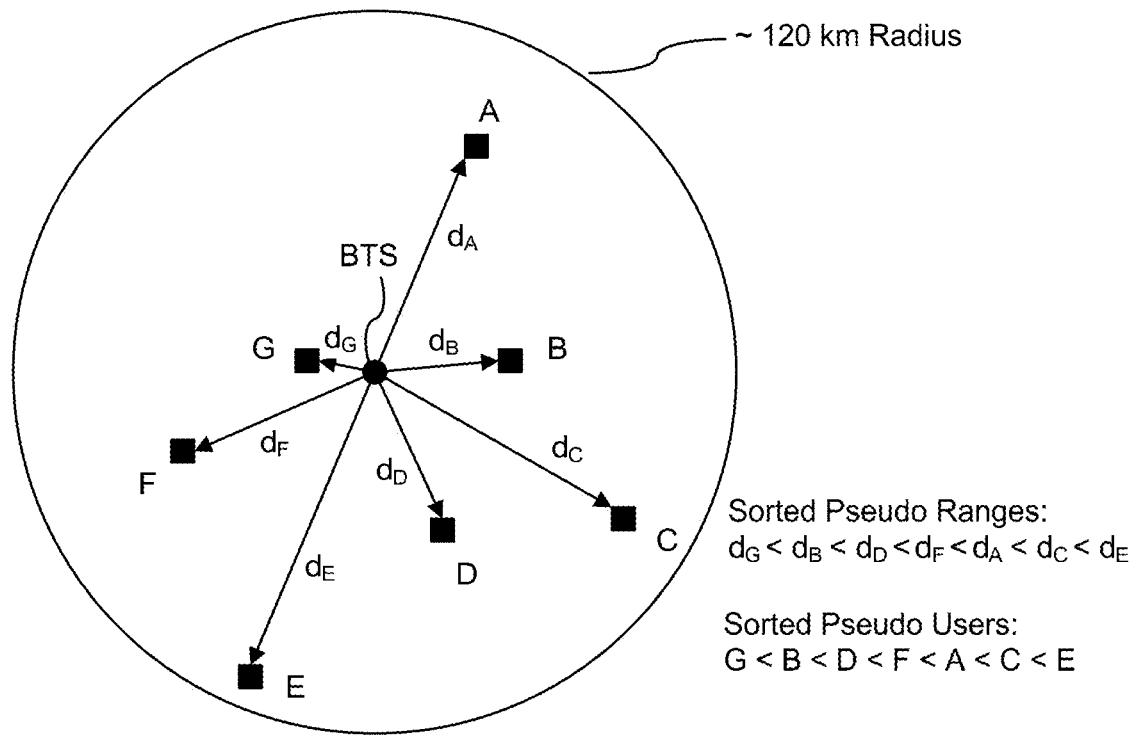
FIG. 7 shows an example of a variety of MSs at different distances from a BTS where those distances are determined, at least approximately.

FIG. 7 shows an example of a variety of MSs at different distances from a BTS where those distances are determined, at least approximately. In this example, there are seven MSs, labelled A through G with respective pseudo distances between $d_A$ through $d_G$. This illustrates how MSs might be sorted by distance.

Figure 8:
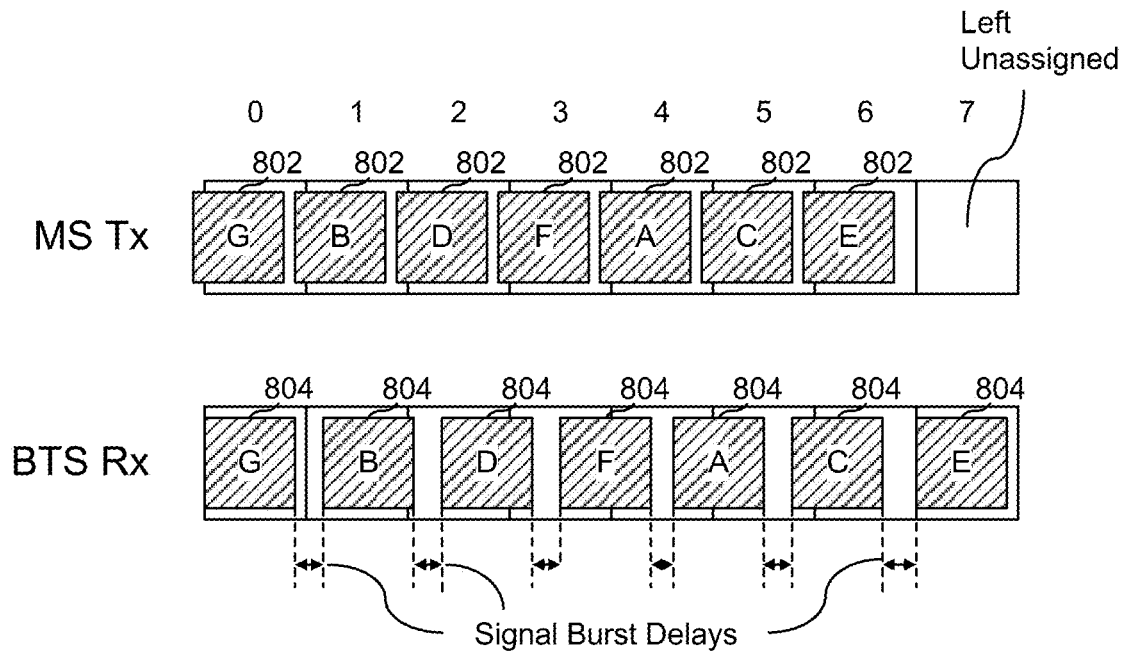
FIG. 8 illustrates how various MSs at different distances in FIG. 7 are assigned timeslots based on their determined distances to provide for sorted extended range communications.

FIG. 8 illustrates how various MSs at different distances in FIG. 7 are assigned timeslots based on their determined distances to provide for sorted extended range communications. As shown in FIG. 8, timeslot 0 is assigned to user G, which in FIG. 7 is the closest to BTS and timeslot 6 is assigned to user E, which in FIG. 7 is the furthest from the BTS. Only seven timeslots are assigned. Given the range of propagation delays, the transmissions 802 from the various MSs are received as receptions 804 such that no transmission 802 overlaps another transmission 802 and all of the receptions 804 are received within the TDMA frame period. As illustrated in FIG. 8, the signal bursts are increasingly delayed over timeslots that can eliminate collisions and interference.

The sorted extended range method has more throughput than the extended range mechanism, but still can allow for up to a 120 km range of MS-BTS distances and ⅞ths of the full frame capacity (so long as there isn't more than a whole 85 km distance gap between two sorted MSs). In some cases, more than one timeslot would be allocated to be split up for distance gaps, and so if N timeslots are so allocated, where N is from 1 to 7, the throughput would be 1−(N/8) of the full frame capacity. Where a timeslot is 156.25 bits, the gaps might be assigned as a number of bits distributed among the timeslots. As this logic is performed by the BTS, implementation of the sorted extended range mechanism does not require any modification to the MS logic or operations because the BTS is orchestrating the calculated timeslot assignments.

Figure 9:
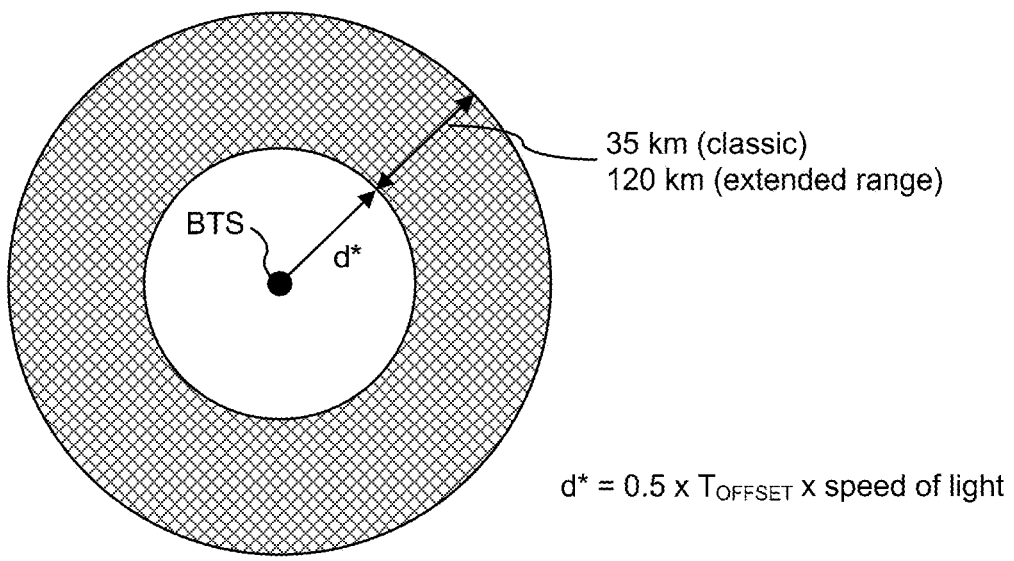
FIG. 9 illustrates a coverage area for a ring method using a synchronization offset.

FIG. 9 illustrates the distance range of a BTS that uses the ring extended range mechanism and a coverage area for a ring method using a synchronization offset. The cross-hatched area is the area that the BTS supports. A MS that is closer than the minimum communication distance, d*, is not supported, as the BTS assumes that all MSs are at least d* away. The 35 km range obtained using the timing advance mechanism can be used to support a MS-BTS range from d* to d*+35 km without requiring any MS modifications. In one example, d*=85 km, but other minimum communication distance might be used. In that example, then, the BTS could support an MS that is between 85 km and 120 km from the BTS.

Figure 10:
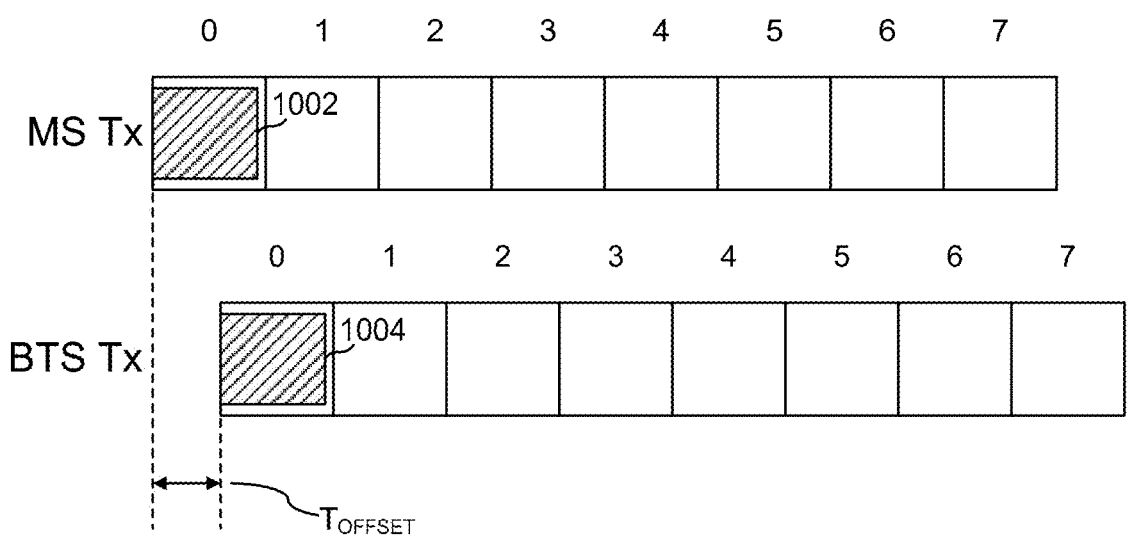
FIG. 10 illustrates how timing is adjusted for the ring method.

FIG. 10 illustrates the timing of transmission and reception and how timing is adjusted for the ring method. The minimum communication distance, d*, scales directly with the timeslot synchronization offset selected for use by the BTS on the uplink subchannels. At the MS, a transmission 1002 is sent by the MS in what it sees as timeslot 0. At the BTS, a reception 404 is received after a propagation delay that is at least d* times the speed of light. Since the value of d* times the speed of light is known, the BTS can simply shift the timing of its timeslots by an offset, T_offset=2× d*/(speed of light), with the 2 accounting for the MS-BTS round-trip distance, and the BTS receives reception 1004 within timeslot 0 at the BTS.

FIG. 11 illustrates an example of a satellite footprint, rings, and the resulting distance ranges for rings of that satellite footprint. A satellite 1102 would have a coverage footprint that in FIG. 11 is illustrated edge on as footprint 1104 and from above as footprint 1106. The different cross-hatching in footprint 1106 indicates different distance ranges between the surface and the BTS, which form rings. In this example, there are seven rings, but more or fewer might be present, depending on needs. In this example, the rings are labeled $r_0$ through $r_6$ and correspond to the BTS-MS distance ranges (which might be pseudo distance ranges) of {500-534.4, 534.4-568.9, 568.9-603.3, 603.3-637.7, 637.7-672.1, 672.1-706.6, 706.6-741} (all in km). Each of these ranges happens to be just less than 35 km, which is a useful design choice as explained below. Other applications might use different design choices. In an initial handshake, such as a RACH process, a BTS-MS distance is determined and from that, an MS can be assigned to one of the rings in the satellite footprint.

As explained below, MSs assigned to a particular one of the rings might all be assigned to one carrier frequency or block of carrier frequencies over which a TDMA/FDMA frame is transmitted, or other approaches might be taken. In some embodiments, the rings might overlap such that a MS can be in more than one ring. For example, the first two rings might be 490-540 and 530-580, so an MS at 535 km from the BTS can be in either of those rings.

Depending on the desired application, an orbital BTS might adjust its protocols and operations according to (1) timing advance method, (2) an extended range method (using fewer than all timeslots that are available and instead using unused timeslots as guard bits), (3) a sorted extended range method (using fewer than all timeslots that are available and instead using unused timeslots as guard bits, allocated between timeslots where the timeslots are assigned based on expected variable delays), (4) a ring extended range method (shifting timing so that coverage is a ring with an inner circle that is not supported), (5) a multi-ring extended range method (like method (4) with multiple rings to cover different ranges of distances at the same time and MSs assigned to a ring based on its BTS-MS distance) and (6) a sorted channel-ring allocation method (like method (5) and with different rings associated with different carrier frequencies and, for a carrier frequency, method (3) is used for the MSs within that ring's distance range to allocate timeslots), or a combination of one or more of (1), (2), (3), (4), (5) and (6).

Timing Advance, Ring and Sorted Extended Range Methods

Figure 12:
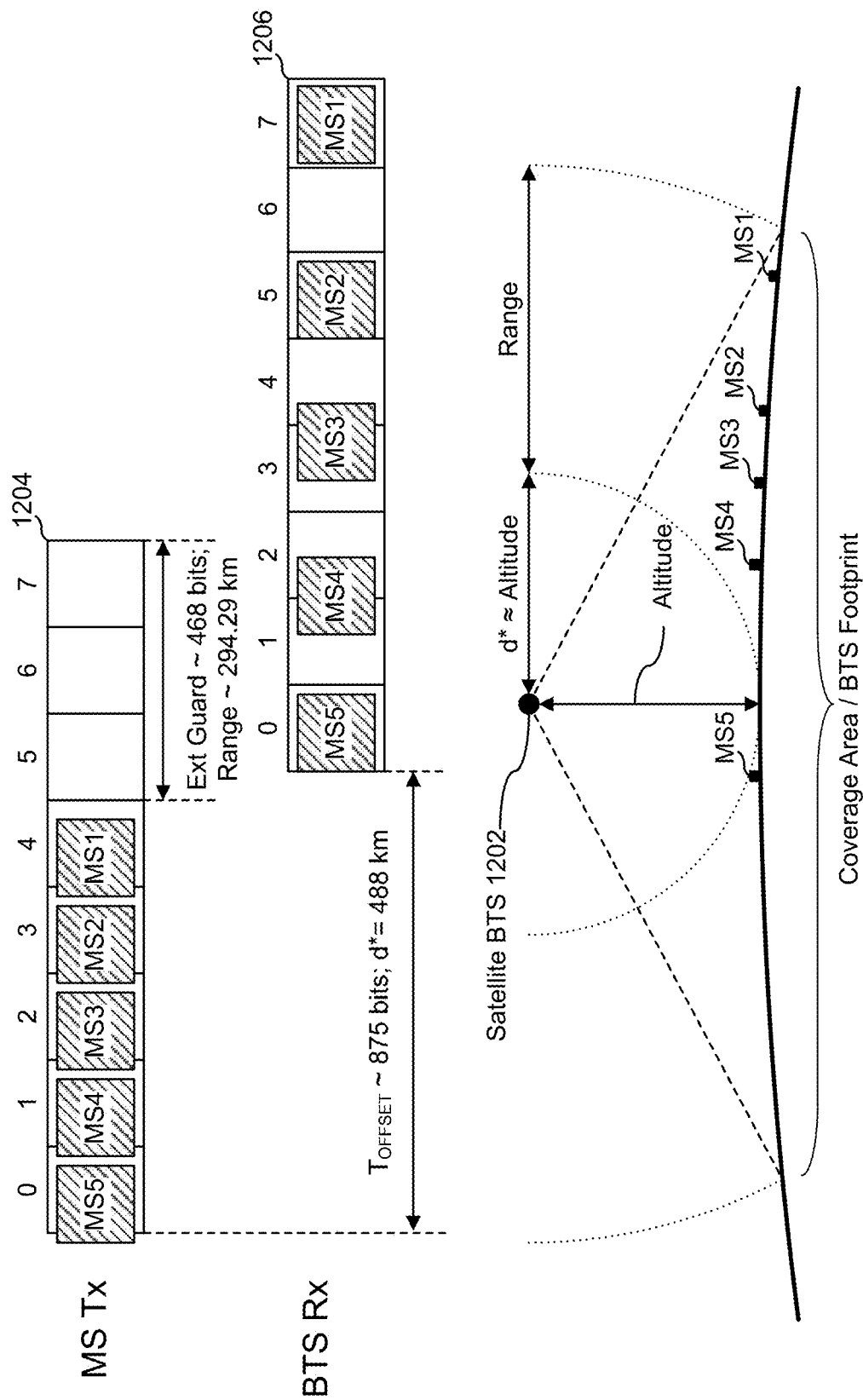
FIG. 12 shows an example of how different mobile stations might be assigned different timeslots based on their terrestrial location to implement a ring method and a sorted extended range method for TDMA communications.

FIG. 12 illustrates a first example, of a BTS using a timing advance method, a ring extended range method and a sorted extended range method. There, different mobile stations might be assigned different timeslots based on their terrestrial location to implement a sorted extended range method for TDMA communications and the ring method is used to get the range to be terrestrial.

In this example, a satellite 1202 is orbiting at an altitude of d* and it is assumed that the satellite 1202 does not need to support an MS that is closer than d* and does not need to support an MS that is further from some maximum distance, $d_{max}$, from the BTS. In this example, there are five MSs, MS1 through MS5, labeled by distance from the BTS, that are between d* and $d_{max}$. The MSs MS1 to MS5 are assigned to timeslots 4 through 0 respectively, with timeslots 5, 6 and 7 unallocated, so that the sorted extended range method can be used with three timeslots worth of guard time. This corresponds to around 486 bits and is illustrated in the MS frame 1204. As a result of the distances between MS and BTS, the signal bursts from MS1 through MS5 are received as indicated in the BTS frame 1206 shown.

In this example, the timing advance is 22 bits (needed for 12 km of range) and the synchronization offset for the ring is 875 bits, which corresponds with a distance of around 488 km, so d* is around 488+12=500 km. The extended range guard time uses up three timeslots, but that provides for a full range of MS-BTS distances (i.e., $d_{max}$–d*) of around 295 km. Assuming up to 35 km of range for the timing advance, which could be from 0 to 63 bits, the sorted extended range method range can be from around 35 km to around 640 km depending on how many timeslots are allocated to guard time, as shown in Table 1. In Table 1, the ranges assume that the full range of 0 to 63 bits of timing advance is available.

TABLE 1

| # of Extended Guard Timeslots | Range (i.e., $d_{max}$ – d*) (in km) |
| --- | --- |
| 0 | ~35 |
| 1 | 121.34 |
| 2 | 207.82 |
| 3 | 294.29 |
| 4 | 380.76 |
| 5 | 467.24 |
| 6 | 553.72 |
| 7 | 640.19 |

This TDMA frame structure allows for satellite-based cellular coverage of a large geographic area. Even with this solution, there are still operational problems and challenges that need solving. Firstly, each frame has just over one-half of the throughput potential of a typical GSM frame. Secondly, in this configuration, each frame will be subject to a variable Doppler shift of between plus or minus ~35 kHz (which will vary from solution to solution depending on orbit selection, slant range, frequency use, etc.). The Doppler shift issue can be mitigated, however, using the on-orbit BTS methods and apparatus described herein. The timing challenge might be solved with the next method.

Timing Advance and Sorted Channel-Ring Allocation Methods

Figure 13:
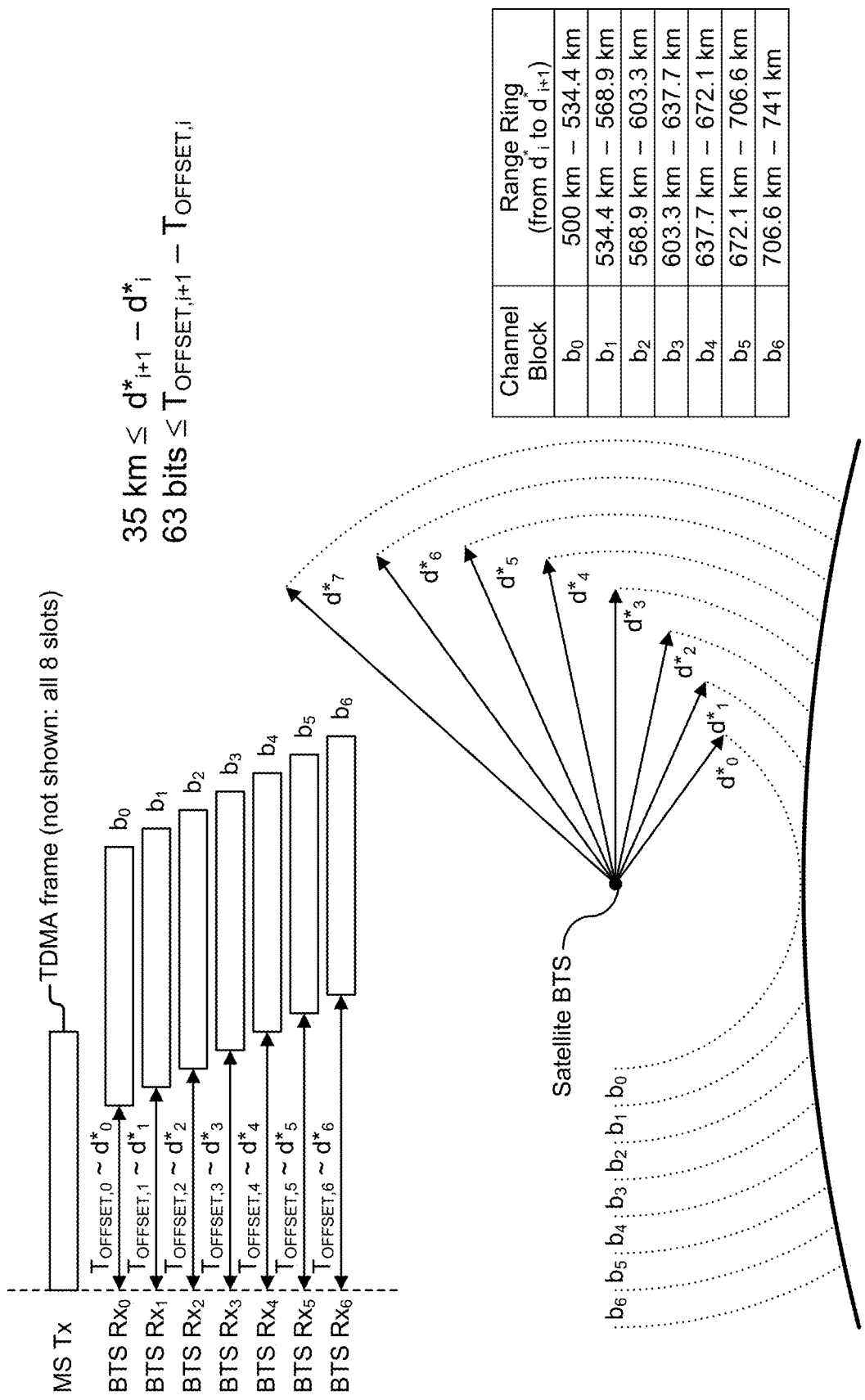
FIG. 13 illustrates how different mobile stations might be assigned different carrier frequencies based on their terrestrial location distances so that the ring method can be used with varying ring diameters for different carrier frequencies.

FIG. 13 illustrates how different mobile stations might be assigned different channels based on their terrestrial location relative to the BTS so that the ring method can be used with varying ring diameters for different channels. As shown there, a method that uses timing advance (for a ~0 to 35 km range) and a sorted channel-ring allocation method can provide around another 241 km of range without using up timeslots. With the sorted channel-ring allocation method, the satellite footprint is divided up into rings as illustrated in FIG. 11 and each ring is paired with a distinct carrier frequency. Each ring operates with a different synchronization offset.

As used herein, a channel might comprise one or more specific frequency divisions in a protocol, such as a group of carrier frequencies. In FIG. 13, the range of supported pseudo distances between the nearest and farthest potential targets is 241 km, partitioned into seven pseudo distance range rings. This results in coverage ranges of around 34 km per ring and the synchronization offsets can be different for different rings assigned to channel blocks, or sets of channels. By having the offsets from channel block to channel block be less than around 35 km, full throughput is possible in each channel by eliminating the need for extra slot guard periods and then timing advance by itself is sufficient.

RACH request bursts can be used to determine the propagation distance from each MS's signal. The BTS can use the broadcast channel (BCCH) to constantly or periodically notify MSs on the RACH as to which carrier frequency and timeslot the BTS assigns to that MS for use to uplink. The BTS would know exactly when the MS will transmit its RACH burst and can count the number of bits between that time and when the actual burst arrives. By dividing that number of bits by the channel bit rate (270.83 kbps for GSM), the BTS can calculate the round-trip propagation delay time. The BTS then calculates the propagation distance, or pseudo distance, by dividing the speed of light by the round-trip propagation delay time. Depending on the calculated pseudo distance, each MS qualifies for an assignment to a channel in a particular channel block. For instance, in the configuration shown in FIG. 13, channels in channel block $b_0$ are assigned to MSs that have calculated pseudo distances between 500 km and ~534 km; channels in channel block $b_1$ are assigned to MSs that have pseudo distances measured between ~534 km and ~568 km from the on-orbit BTS, and similarly for other ranges as shown in FIG. 11 and FIG. 13.

The first channel block, $b_0$, has uplink TDMA frames that are offset from the transmit uplink frames by the same amount as shown in FIG. 12. The following channel block, $b_1$, has frames that are offset by an additional ~62 bits from the frame of channel block $b_0$. Each channel block's frame thereafter has ~62 bits in additional offset compared to the previous channel block (i.e., the frame of channel block $b_{i+1}$ is offset an extra ~62 bits from the frame of channel block $b_k$). This configuration, leveraging 62 bits, creates the various coverage rings, each ~34 km, as each bit of frame offset corresponds to around 555 m, and each ring/channel block is extended ~34 km further than the prior one. By assigning various synchronization offsets, each channel block exhibits coverage of a different ring in space (and on the surface of the Earth). When the channel blocks are given synchronization offsets in increments of 62 bits and the classic embodiment of GSM is used, full throughput can be achieved on every channel, and vastly expansive coverage can be accomplished. This can be done without requiring modification of a GSM MS. A top-down view of the range rings is shown in FIG. 11. Each range ring's channel block is defined by a distinctive "range of distances" which is prescribed for this particular embodiment in the key to the left in FIG. 11.

Doppler Shift Handling

While the above methods and their variations can provide maximum throughput for all channeled spectrum, the frequencies of transmissions might be different on transmission and reception due to relative movement of the BTS and the MSs. A Doppler solution can be used to account for scenarios in which multiple MS may exist within similar pseudo distance ranges from the on-orbit BTS but experience wide variance in perceived carrier frequency shift. For instance, consider two MS that are calculated to exist within the same ring/channel block, $b_6$, in FIG. 11, where one MS is positioned at the top forward tip of the satellite coverage footprint while the other is positioned at the bottom tip of the satellite coverage footprint.

In FIG. 11, the satellite is directly above the center of the coverage area indicated for channel block $b_0$ (at the origin of the arrow) and is moving in the direction of the arrow labeled "velocity". A first MS in front of the satellite velocity vector will experience a positive Doppler shift in received frequency, while a second MS behind the satellite velocity vector will experience a negative Doppler shift in received frequency. If these MSs are assigned the same frequency, the satellite could receive signal burst frequencies from the MSs that are many kilohertz apart (up to 70 kHz apart, in the case of 1800/1900 GSM band). Furthermore, assigning adjacent channels to MSs that experience widely different Doppler shift environments could result in signal interference at the satellite.

Figure 14:
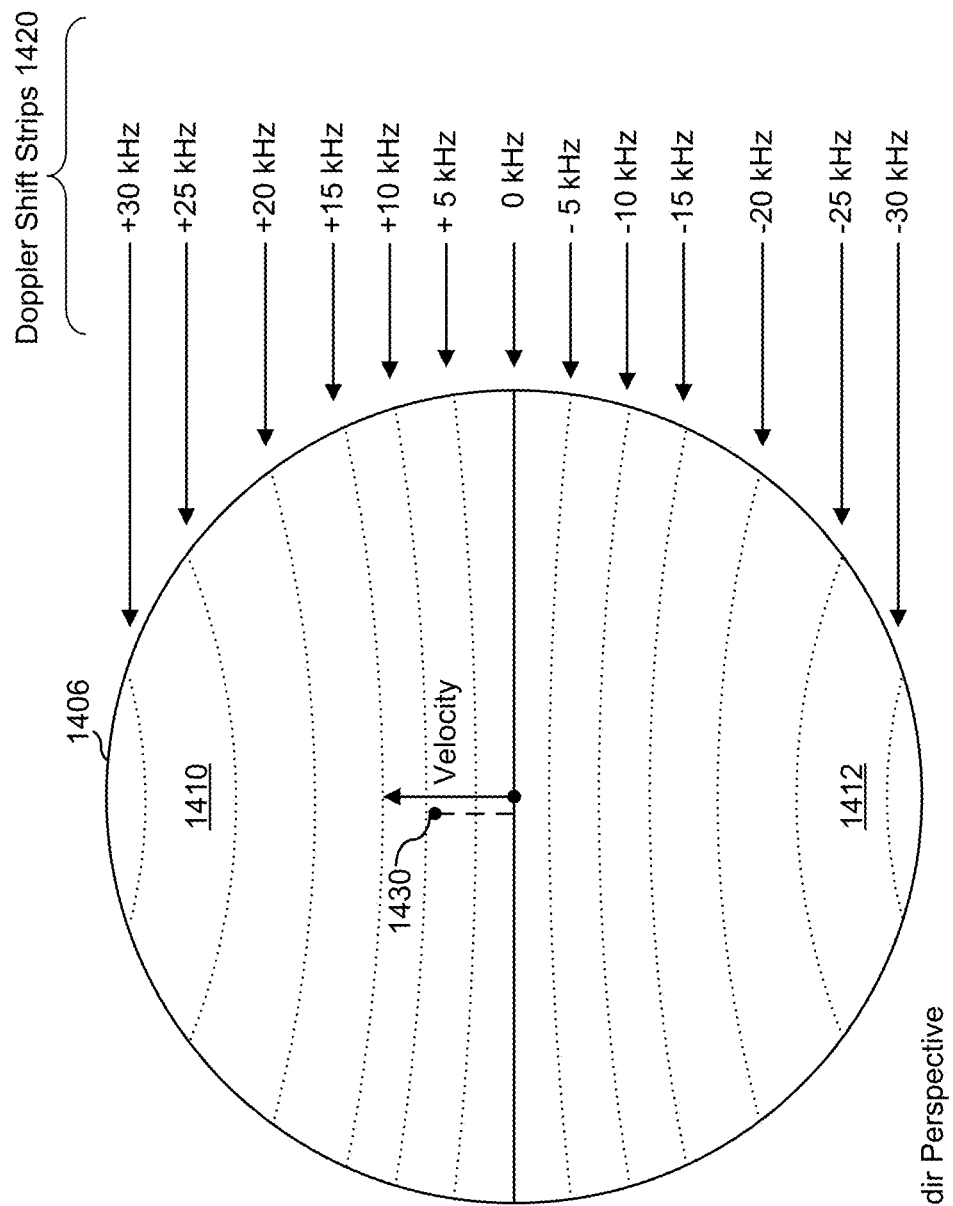
FIG. 14 shows how a satellite footprint might be subdivided into Doppler shift strips.

FIG. 14 shows how a satellite footprint might be subdivided into Doppler shift strips for methods of mitigating this issue. As illustrated there, assume a satellite 1402 traveling with a velocity relative to the surface 1404 of the Earth. The satellite footprint 1406 is a view from the satellite with the velocity as indicated. A MS in area 1410 of the satellite footprint 1406 vector will experience a positive Doppler shift in received frequency of signals from satellite 1402, whereas a MS in area 1412 of the satellite footprint 1406 vector will experience a negative Doppler shift in received frequency of signals from satellite 1402. The specific Doppler shift in received frequency can be determined using simple geometry, and for ranges of Doppler shifts, the satellite footprint 1406 might be divided into strips delimited by the contour lines and the contour lines assigned values 1420 for their respective Doppler shifts.

In three-dimensional space, the Doppler shift at any point within the satellite footprint can be calculated by the BTS or the MS, given sufficient information. One method of doing so might assume all vectors are represented in the Earth-Centered, Earth-Fixed (ECEF) coordinate frame. This is also known as Earth's rotating frame because it is the coordinate system that rotates in space with the Earth around its axis of rotation). In this process, each of the vectors are treated as vector quantities with three component values, such that each component value in the vector represents a value along each dimension of the coordinate frame represented by the vector. Such numbers can be stored in memory for a processor to manipulate.

If $\underline{r}_{BTS}$ represents the position vector of the satellite in ECEF coordinates and $\bar{r}_{MS}$ represents the position vector of the MS in ECEF coordinates, then the position vector of the MS with respect to the BTS would be $\underline{r}_{MS/BTS} = \underline{r}_{MS} - \underline{r}_{BTS}$. Similarly, if $\underline{v}_{BTS}$ represents the velocity vector of the satellite in ECEF coordinates and $\underline{v}_{MS}$ represents the velocity vector of the MS in ECEF coordinates, then the velocity vector of the BTS with respect to the MS is $\underline{v}_{BTS/MS} = \underline{v}_{BTS} - \underline{v}_{MS}$. To calculate the Doppler shift, the magnitude of the component of the BTS's velocity with respect to the MS, $\underline{v}_{BTS/MS}$, in the direction, or unit-vector, of the position of the MS with respect to the BTS, $r_{MS/BTS}/\|r_{MS/BTS}\|$, a processor computes this position and then divides by the wavelength of the assigned carrier frequency wave. This can be done using the dot product of the two vectors of interest, $\underline{v}_{BTS/MS}$ and $r_{MS/BTS}/\|r_{MS/BTS}\|$, and can be written as in Equation 1 and perhaps implemented in program code.

$$D = \left[ V_{BTS/MS} \cdot \frac{r_{MS/BTS}}{\|r_{MS/BTS}\|} \right] * \frac{1}{\lambda} \qquad \text{(Eqn. 1)}$$

In Equation 1, D is the computed Doppler shift and $\lambda$ is the wavelength of the carrier frequency wave, which can be computed as the carrier frequency divided by the speed of light.

By way of example, consider a spacecraft operating in an equatorial orbit at an altitude of 500 km and happens to be right above the prime meridian at a particular instant (e.g., directly nadir relative to the satellite is the intersection of the equator and the prime meridian). At the same particular instant, a stationary MS 1430 is positioned approximately at sea level below the spacecraft but rests on the equator at 1 degree east longitude (e.g., latitude longitude position can be described as [0, 1]).

In this scenario, the ECEF position coordinate of the satellite is approximately [6870 km; 0 km; 0 km]. The velocity vector of a spacecraft in a circular orbit at 500 km is approximately perpendicular to the position vector and parallel with the equator (for equatorial orbit). The magnitude of the velocity vector with respect to the Earth's surface can be calculated as SQRT(mu_earth/(R_e+h))−w_earth*(R_e+h)=7.11 km/s, where mu_earth is the Earth's gravitational constant (mu_earth=398658.366 km$^3$/s$^2$), R_e is the radius of the Earth at the equator (R_e ~6370 km), w_earth is the angular velocity of the Earth's rotation (w_earth=7.27*10$^{-5}$ radians/second), and h is the altitude of the satellite (h =500 km in this example). The ECEF velocity vector of the spacecraft is therefore approximately [0 km/s; 7.11 km/s; 0 km/s]. The ECEF position of the stationary MS at 0 degrees latitude and 1 degree east longitude is approximately [R_earth*cos(1°); R_earth*sin(1°); 0]=[6369 km; 111 km; 0]. The ECEF position of this stationary MS with respect to the spacecraft is therefore, [6369 km; 111 km; 0]−[6870 km; 0 km; 0 km]=[−501 km; 111 km; 0]. The Doppler shift of a 1900 MHz signal received by this MS from the spacecraft will therefore be as shown in Equations 2, 3 and 4.

$$D = \left[ v_{BTS/MS} \cdot \frac{r_{MS/BTS}}{\|r_{MS/BTS}\|} \right] * \frac{1}{\lambda} \quad \text{(Eqn. 2)}$$

$$D = \left[ \left[ 0; 7.11 \frac{\text{km}}{\text{s}}; 0 \right] \cdot \frac{[-501 \text{ km}; 111 \text{ km}; 0]}{513.149 \text{ km}} \right] * \frac{1}{0.158 \text{ m}} \quad \text{(Eqn. 3)}$$

$$D = 9.734 \text{ kHz} \quad \text{(Eqn. 4)}$$

As explained above, the signal received from a MS on the RACH at the BTS can be used to calculate the pseudo distance. It can also be used to approximate the Doppler shift from the MS. Much like the BTS knows what timeslot the RACH is on, it also knows what carrier frequency it is on. So, when the BTS receives the RACH burst, it can measure the center of the burst frequency and calculate its offset (difference) from the expected center frequency on the RACH. This may or may not require the satellite BTS to listen on a wider frequency range on the RACH depending on what magnitude of Doppler shift the system experiences.

Figure 15:
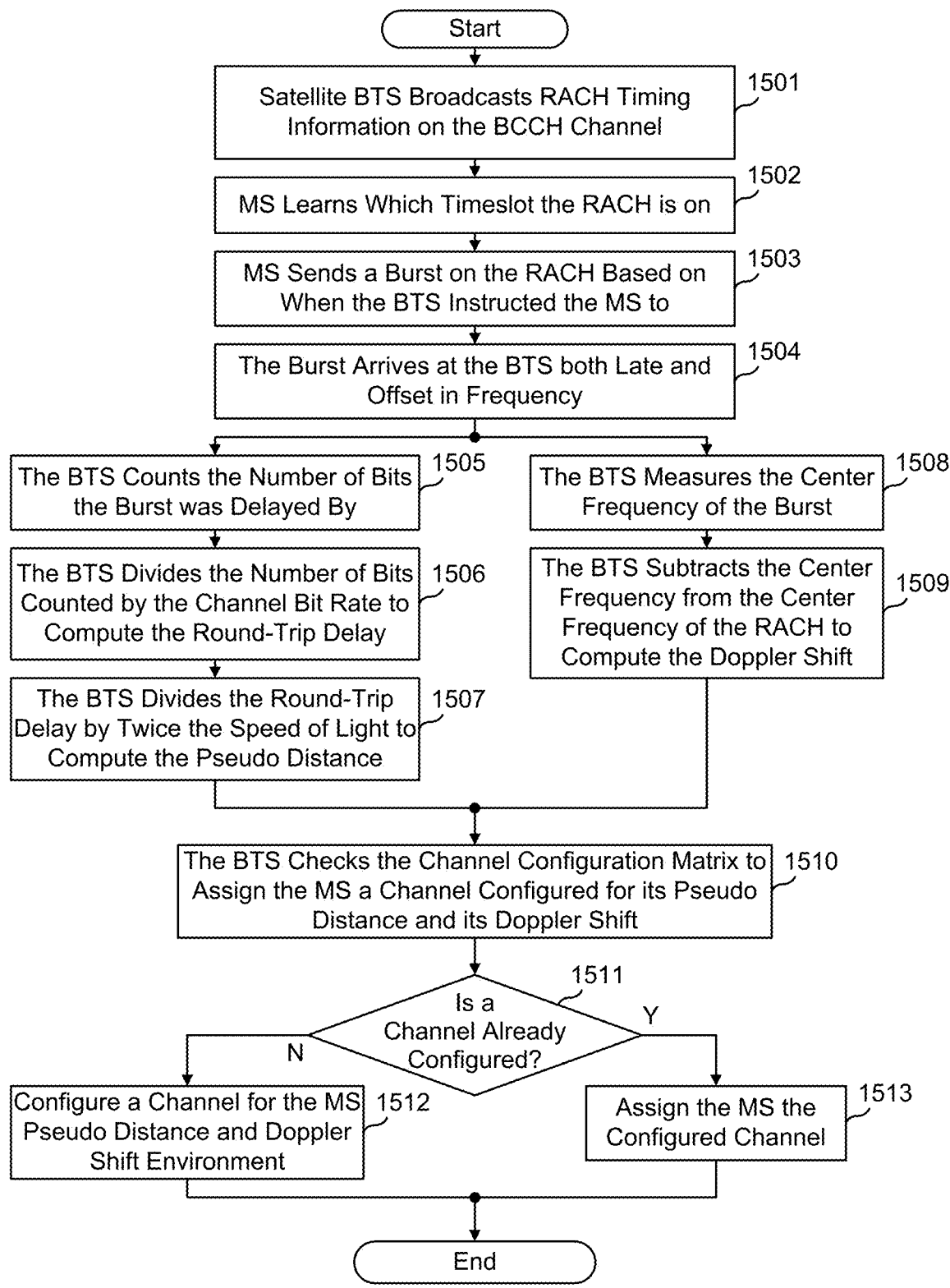
FIG. 15 is a flowchart of a measurement process to determine a pseudo distance and a Doppler shift from a MS.

FIG. 15 is a flowchart of a measurement process, which might use RACH, for a BTS to determine a pseudo distance and a Doppler shift from a MS. A RACH might be indicated when a MS wants to initiate a session (e.g., send an SMS text, make phone call, send data). The Doppler shift value does not need to be measured/updated often. The Doppler shift value changes over the time it takes to request access to the channel and send the data payload are typically not large enough to be damaging to the system's ability to send/receive the signals. In cases where that might be an issue, the BTS can make predictive changes and assume the MS isn't moving very fast. This process can be used for the satellite BTS in managing the measurement of pseudo distances and Doppler shifts to coordinate channel assignment/allotment.

As illustrated in the flowchart of FIG. 15, at the start of the process, a satellite BTS broadcasts RACH timing information on the BCCH channel (step 1501) and then a MS learns which timeslot the RACH is on (step 1502). Knowing that, the MS sends a burst during the RACH timeslot that the BTS instructed the MS to use (step 1503). The burst arrives at the BTS both late and offset in frequency (step 1504). The BTS flow then has two threads, one for delay and one for Doppler shift. In the first flow, the BTS counts the number of bits the burst was delayed by (step 1505), divides the number of bits counted by the channel bit rate to compute the round-trip delay (step 1506), and then divides the round-trip delay by twice the speed of light to compute the pseudo distance (step 1507). In the second flow, the BTS measures the center frequency of the burst (step 1508), and subtracts the center frequency from the center frequency of the RACH to compute the Doppler shift (step 1509). The two threads then combine and the BTS checks the channel configuration matrix to assign the MS a channel configured for its pseudo distance and its Doppler shift (step 1510). The BTS then checks whether a channel is already configured (step 1511). If yes, the BTS assigns the MS the configured channel (step 1513) and if no, the BTS configures a channel for the MS pseudo distance and Doppler shift environment detected (step 1512), and the process ends.

Since the BTS can acquire knowledge of the Doppler shift from each MS, it can assign specific Doppler shift ranges to specific channels. In doing this, each individual channel can have its own specific and locally reduced range of potential Doppler shift values. For instance, some channels may only ever experience 0 to 5 kHz shift in carrier frequency, while others will only ever experience 25-30 kHz shift in carrier frequency, as the channels are assigned to MSs in specific strips shown in FIG. 14. Since the Doppler range is clearly defined and more localized for each channel, it can be used as a qualifier for channel allocation and assignment. This method makes it much simpler to handle wide Doppler shift variances across the entire set of serviceable MSs within the satellite footprint.

Referring back to FIG. 14, that figure illustrates the perceived Doppler shift at various locations across the satellite coverage footprint. Intuitively, half of the satellite footprint in direction of the velocity vector will experience a positive Doppler shift while the other half will experience negative Doppler shift. What is less intuitive is that the geometry of the curvature of the earth creates a Doppler shift map in the satellite footprint that is described by increasingly curved contour lines.

One approach, as described herein, is to allocate channel blocks into pre-determined Doppler shift blocks, much like the channel blocks are allocated into pre-determined pseudo distance range rings, as described above. If the carrier frequencies are assigned to specific pseudo distance ranges and Doppler shifts, the actual Doppler shift experienced on each channel will be unique to that channel's frequency. Implementations of this method would account for this. In one design, the contour map for Doppler shifts uses the center frequency for the spectrum in discussion and in the figure, GSM at 1900 MHS with a 500 km altitude satellite and 40 degree elevation angle is assumed.

In FIG. 14, each dashed line defines a border for a Doppler shift strip that is used to localize the potential Doppler shift for each channel and, therefore, minimize interference. The curvatures of the contour lines on the map are a result of the geometry of the communication link as well as the frequency of communication.

Figure 16:
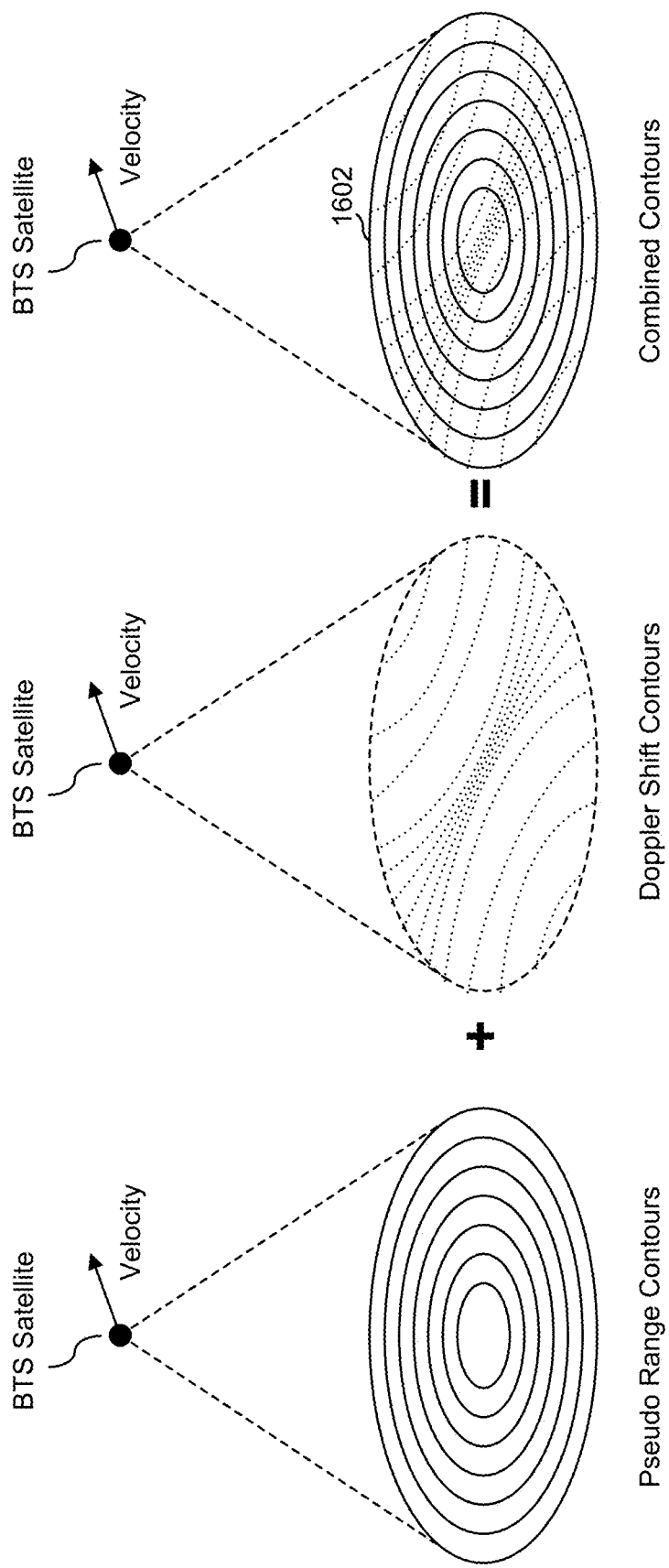
FIG. 16 shows how a satellite footprint might be subdivided into range rings, into Doppler shift strips, and into both range rings and Doppler shift strips.

FIG. 16 shows how a satellite footprint might be subdivided into range rings, into Doppler shift strips, and into both range rings and Doppler shift strips. As illustrated, the ranges of pseudo distances form rings and the Doppler shift contours form strips. Overlaying these into a grid (not necessarily an orthogonal or linear grid), a satellite footprint 1602 is divided into grid cells bounded by a first distance value, a second distance value, a first Doppler shift value and a second Doppler shift value. Each of these grid cells corresponds, therefore, to a combination of a range of pseudo distances and a range of Doppler shifts relative to the on-orbit BTS and is the qualifier for a MS to be assigned a particular channel (or one within a set of particular channels).

It should be noted that while the satellite footprint represented here is circular in nature, that is not required. The footprint could be more square or elliptical in shape depending on which antennas are used on the satellite and how they are configured. A non-circular footprint might provide advantages in that it can increase or decrease the spread of propagation delays and/or Doppler shift environments within the footprint.

This grid represents the combinations of ranges of pseudo distances and ranges of Doppler shifts that correspond to the qualifications for the pseudo distance and Doppler shift channel blocks. The grids cells described above are assumed symmetric about the satellite velocity vector. This means that each grid cell that is off of the centerline of the satellite coverage area has a "twin" grid cell on the opposite side of the satellite footprint. The term "twin" grid cell is used because these two grid cells share a "bucket" that is logically associated with a range of pseudo distances and a range of Doppler shifts (i.e., an MS is logically assigned to a bucket based on whether the MS's pseudo distance is within the range of pseudo distances assigned to that bucket and the MS's Doppler shift is within the range of Doppler shifts assigned to that bucket), since MSs in both of these grid cells operate at similar pseudo distances and Doppler shifts.

Handling Doppler Shifts of Certain MS Devices

Some protocols might be more resilient to Doppler shifts when demodulating a downlink signal, while others might be less so. In some devices, or some protocols, a shift of 2.5 kHz might be the Doppler shift threshold. However, even some low-end cellular telephones might be able to demodulate the BCCH signal with up to a 20 kHz offset from what would typically be that channel's center carrier frequency. This may relate to an interaction between the BTS and the MS on the FCCH (Frequency correction channel), which is another broadcast channel that the MS uses to synchronize its local clock with the BTS. This synchronization is ultimately the information the phone needs to then demodulate the BCCH and other downlink channels. Thus, Doppler shift strips larger than the exemplary 5 kHz strips used in an example above might be used. For example, the buckets might be adjusted and stretched to accommodate larger ranges of Doppler shifts, up to at least 20 kHz in either direction. In effect, this can obviate the need for Doppler shift bucketing when the satellite footprint is small enough that the highest Doppler shift case is less than 20 kHz. This might not be true for other protocols, such as NB-IoT, which use much smaller signal bandwidths. NB-IoT also has other differences, such as the case where the multiple-access protocol is an LTE NB-IoT protocol and the limited distance is 40 km, which would be exceeded by the base-to-mobile distance.

Channel Assignment

As explained herein, a BTS can support multiple transceivers each using their own carrier frequency that can in turn each support up to eight MSs. A channel can be associated with a transceiver as the transceiver can be set to use one of many possible carrier frequencies. In an example above, there are 123 available carrier frequencies. Of those many carrier frequencies, they can be assigned to MSs as needed, but some advantages might be had if they are allocated by grid cell, so that buckets of similarly situated MSs having similar distances from the BTS and similar Doppler shifts use the same carrier frequency and the carrier frequencies can be strategically assigned. A channel (which might logically comprise an uplink subchannel and a downlink subchannel, as explained above), can be assigned one of the plurality of timeslots and one of the plurality of carrier frequencies. A channel might be identified solely by its assigned characteristics, such as its carrier frequency and its timeslot, but for some situations, each channel is given a channel label. A channel's label might encode the channel's carrier frequency, its timeslot, and possibly its timing advance, and Doppler shift, but it could be that the labels are simpler, such as sequential numbers, and the BTS and/or MS include a stored mapping of channel number labels to assigned characteristics (e.g., channel 1 uses carrier frequency $f_1$ and timeslot 0, channel 2 uses carrier frequency $f_7$ and timeslot 3, etc.).

Figure 17:
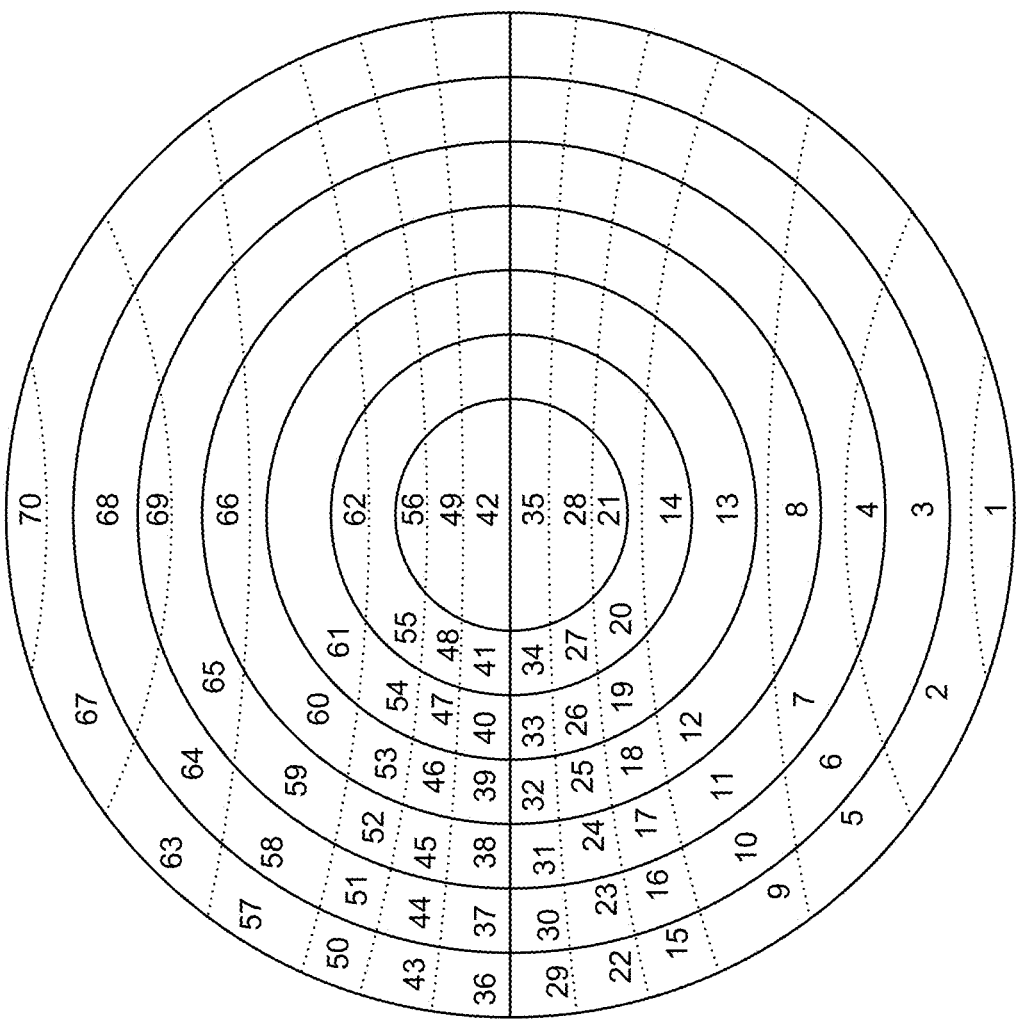
FIG. 17 illustrates an example of range ring/Doppler shift cells of a satellite footprint.

FIG. 17 illustrates one example of range ring/Doppler shift cells of a satellite footprint. The intersection of the pseudo distance rings and the Doppler shift strips form a footprint grid. The grid cells, range ring/Doppler shift cells, can be assigned channels.

FIG. 18 illustrates an example assignment of the range ring/Doppler shift cells of FIG. 17 to particular carrier frequencies and Doppler offset blocks. The logical channel blocks can be associated with one or more carrier frequencies and/or timeslots on the TDMA frames using those carrier frequencies. In FIG. 17, channels are shown with arbitrary channel labels, in this case from 1 to 70. They happen to be in labeled in order from bottom to top, i.e., from most negative Doppler shift to most positive Doppler shift. The channels 1 to 70 might correspond to channels assigned to each of eight timeslots in frames that use eight carrier frequencies and six timeslots in a frame for one more carrier frequency.

The diagram of FIG. 17 shows how the grid cells of the satellite footprint are assigned channel numbers. Only the left side of the footprint is shown numbered, but it should be understood that the twin cells on the right are also assigned to those channel numbers. The channel allocation table in FIG. 18 illustrates a channel allocation scheme in which each channel number is associated with, allocated or assigned a Doppler offset block corresponding to a Doppler shift strip (from $D_0$ to $D_{13}$) and a channel block (from $b_0$ to $b_6$). Note that in other embodiments, the number of channels might change with the decision for how to "bucket" pseudo distances and Doppler shifts for MSs. Multiple channels can be assigned to a grid cell. In the example of FIGS. 17 and 18, one channel number is assigned per grid cell for simplicity. Only half of the grid cell is filled out with channel assignments because it is symmetric about the satellite velocity vector. The grid cells that are not filled in, in an actual implementation, are assigned the same channel number in the grid cell on the opposite side relative to it in the contour map. This is because although the symmetric grid cells exist in different physical locations on the contour map (and in the real world), they represent the same qualification parameters in terms of pseudo distance from the on-orbit BTS and Doppler shift.

Pinching and Fraying

A "pinching and fraying" feature of the BTS design is useful when the uplink subchannels exist in contiguous spectrum and downlink subchannels exist in contiguous spectrum and when the Doppler shifts can equal or exceed the signal bandwidth, but these do not have to be the case in order to implement the following technique.

The table in FIG. 18 is the channel assignment matrix that the on-orbit BTS would use to determine how to assign channels to a MS and would assign them in a manner where adjacent numbers are assigned adjacent carrier frequencies.

When a signal burst is received on the RACH, the calculated Doppler Shift and calculated pseudo distance estimates are used to determine which channel should be assigned to that MS by finding the appropriate grid cell and looking up the channel number for the MS from the table. In this example, not every channel block (the columns in FIG. 18) has the same number of actual channels in use or available because not every channel block corresponds to pseudo distances that could experience a full range of Doppler Shift. The BTS stores a copy of this table and might have different versions of this table, for use when assigning a channel number based on grid cell.

Figure 19:
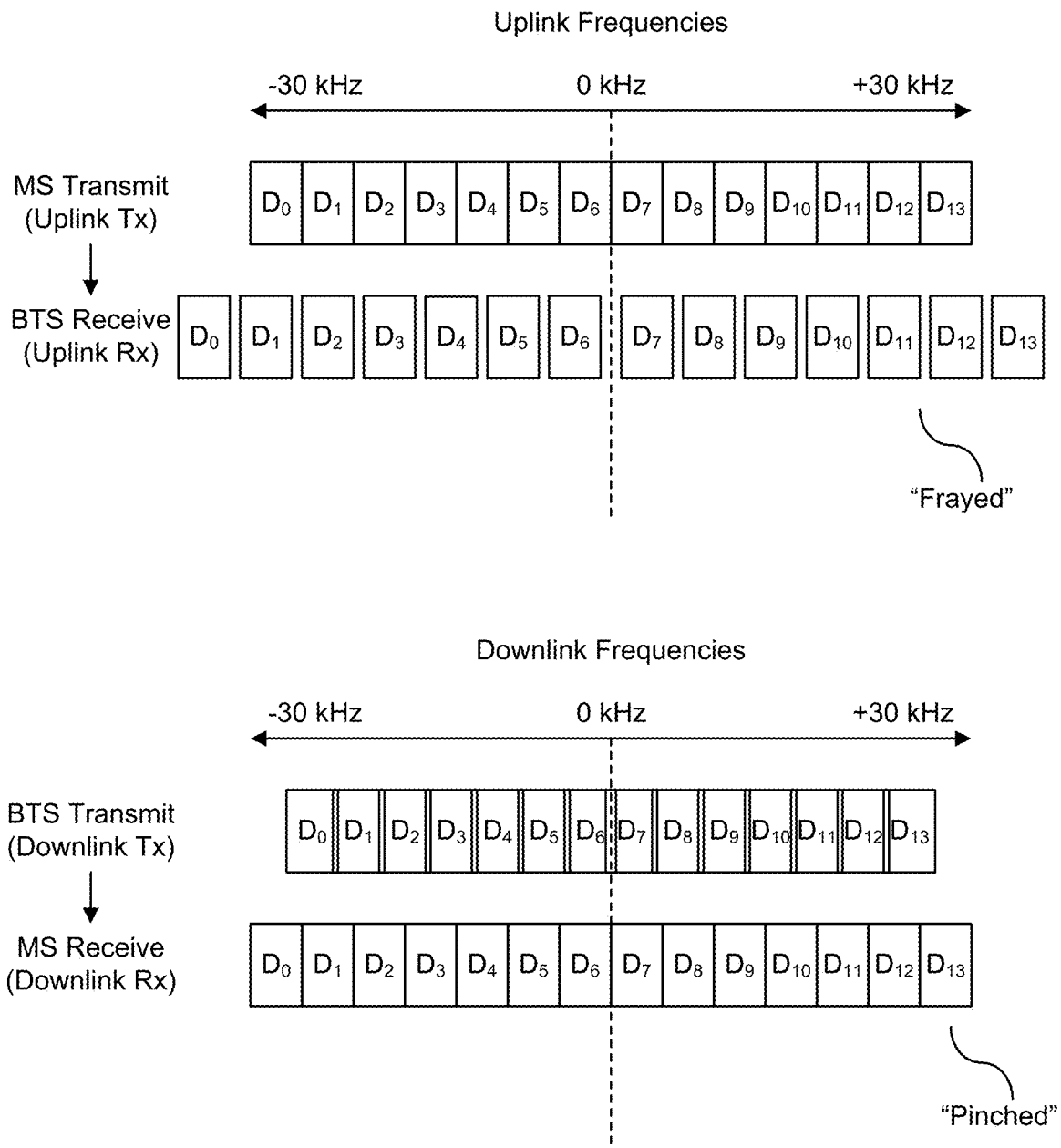
FIG. 19 illustrates how frequency spectra might be allocated to the various Doppler offset blocks for a channel considering the Doppler shifts in communication between the BTS and the MSs.

Benefits of a channel assignment wherein the channels are assigned in order of grid cells having particular Doppler shifts are illustrated in FIG. 19. Since the spacecraft is actively assigning channels based on expected Doppler shift, it no longer needs to account for such a wide range of shift in received frequency. Instead, the on-orbit BTS can command the existing MS infrastructure to communicate on a certain carrier frequency, but will listen on a slightly shifted carrier frequency depending on how much Doppler shift is expected on that channel. This reduces adjacent carrier frequency interference at the spacecraft segment.

In this particular embodiment, the Doppler shift contours are spaced every 5 kHz, but other spacing might be used. For each channel that is assigned to a MS, therefore, the satellite BTS will listen on a carrier frequency that is the average of the maximum and minimum Doppler shifts for the carrier frequency of that channel and check for a data burst in the timeslot assigned to that channel. For instance, assume channel 70 has been assigned to a MS and is logically associated with a frequency $F_{70}$ and a timeslot $T_{S70}$. The BTS on the spacecraft would listen for an uplink signal from the MS at a carrier frequency of $TS_{70}$+27.5 kHz. This way, no signal is more than 2.5 kHz offset from the frequency being listened to by the BTS. In the return link, the on-orbit BTS can transmit a signal on channel 70 by transmitting its burst at $TS_{70}$–27.5 kHz so that the signal is received at the MS within a reasonable limit of the carrier frequency that it is listening on.

FIG. 19 depicts a map of the uplink and downlink carrier frequencies that the MS and BTS use to communicate. Specifically, FIG. 19 shows the Doppler blocks referenced in FIGS. 17 and 18, which have widths that are scaled, based on the number of channels that they hold. When the channels are assigned as a function of some known Doppler effect and in order of increasing carrier frequency, the uplink signals "fray" away from each other and define the channels that the BTS chooses to listen on. This mitigates interference at the on-orbit BTS. The downlink transmit frequencies are "pinched" instead of "frayed" to ensure the signal has the appropriate carrier frequency when it arrives at the MS. Note that the Doppler blocks are referenced in both the uplink and downlink frequencies, which implies that each channel has an uplink and downlink component. Other variations are possible.

FIG. 19 shows that the BTS on-orbit listens at slightly frayed frequencies relative to the frequencies transmitted by the MS. This is a result of the novel channel allocation scheme and reduces interference and complexity of Doppler shift when communicating with MSs. In downlink operations, the spacecraft transmits on more "pinched" channels so that the arriving signals at the target MS are the correct frequency. The channel blocks are represented as the Doppler blocks referenced in FIGS. 17 and 18 and have widths that are scaled by the number of channels they hold.

It will be noted that the channels could be allotted to Doppler blocks in decreasing order of signal frequency, as well. This method would reverse the effects of the received and transmitted signals from the BTS perspective. It is reasonable to assume that this technique might actually help enhance the ability to close the uplink signal from the MS. This is because the uplink signals would be "pinched" instead of "frayed" like they are shown in FIG. 19. Since the amount of "pinch" is fairly well understood, the on-orbit BTS would leverage this fact to intelligently narrow the bandwidth that "it listens on" for each uplink channel. This would mean that the received uplink signals are separated by less than 200 kHz (as it is in GSM). In this case, the on-orbit BTS could, in theory, listen on narrower channels, to reduce noise.

Some embodiment of the invention might favor "frayed" or "pinched" channels at the BTS on both the uplink and downlink subchannels. To cater to this, the implementer would assign channels that have increasing uplink signal frequencies and have decreasing downlink signal frequencies. This would result in "frayed" channels for the BTS uplink receive and downlink transmit functions. The reverse, channels with decreasing uplink signal frequencies and increasing downlink signal frequencies, would result in "pinched" channels for the BTS uplink receive and downlink transmit functions.

While FIG. 19 illustrates channels as boxes, one per Doppler block, it should be understood that a box in FIG. 19 that is frayed or pinched can correspond to one or more carrier frequency and one or more timeslot. For example, in the example of Doppler block $D_9$, FIG. 18 shows that channels 50 through 56 are assigned to cells in the strip covered by that Doppler block. Channels 50 through 56 might represent seven timeslots in frames of one carrier frequency, one timeslot in frames of seven different carrier frequencies, or some other configuration.

Location Finding

In addition to data communication between a BTS and an MS, the BTS can be used for location finding, i.e., determining a geographic location of the MS, at least approximately or with sufficient resolution for various uses (supporting remote search and rescue operations, for instance). When a satellite passes over a MS, the BTS of that satellite determines (as explained above) a grid cell for the MS (actually a pair of twin grid cells). When another satellite passes over the same MS, the BTS of that second satellite will determine a pair of grid cells in that second satellite's footprint. If the second satellite is in a different orbit than the first satellite, the symmetry lines for its pseudo distance range ring and Doppler shift contour strip will be somewhat different than that of the first satellite. The BTSs assume that the MS has not moved, or has only moved slightly, on the scale of the satellite footprints and where the two pair of grid cells are such that one grid cell for a satellite overlaps one grid cell for the other satellite, and the other two grid cells don't overlap, from that a BTS can determine a likely location of the MS.

This can be used alone or in combination with other location-finding systems.

Software-Defined Radio; Dynamic Allocation by Density

The BTS performs various functions as described herein. The BTS might be implemented with commodity software-defined radios, programmed or configured with the particular functionality provided herein. A software-defined radio could be reprogrammed in orbit to shift around the channel configuration in the BTS channel allocation scheme. This would be valuable when the MSs on the ground are not evenly distributed. For instance, if the BTS has a mapping of connected MSs, or a mapping of anticipated MSs, as illustrated in in FIG. 20, or where the BTS is getting a large majority of its requests from MSs that are exhibiting particular Doppler shift ranges and are operating within similar pseudo distances, the BTS can favor the more crowded grid cells with more channels. Thus, the Doppler shift and pseudo range data can be used to prorate channel allocation. The right side of FIG. 20 is a diagram showing, for each grid cell, how many channels might be allocated to that grid cell. Only one half circle is shown, with the assumption that the satellite footprint is symmetrical about a velocity vector of the satellite.

FIG. 21 illustrates an example channel allocation table that might be used for the allocation and mapping illustrated in FIG. 20, with channel allotment mapped with ordered channels in a channel allocation scheme. To reconfigure a channel to service a grid cell, the transceiver for the channel is reconfigured with a different timeslot synchronization offset from the transmit TDMA frames and the transceiver gets an update to its configured frequency offsets for receiving and transmitting on uplink and downlink carriers, respectively. When the channels are reconfigured and remapped to the channel allocation scheme, they can remain in order (increasing or decreasing) counting from the bottom right corner of to the top left corner of the channel allocation table as shown. The channel allocation table might be stored in computer-readable memory accessible such that a processor that controls a software-defined radio can set frequencies and timing according to the channel allocation table.

In addition to remapping channels to blocks, an on-orbit software defined radio could also reconfigure its block mapping. For instance, if MSs were densely packed, the BTS could reconfigure its channel allocation scheme in more refined intervals of pseudo distance and Doppler shift to improve its service, particularly throughput, for specific geographic areas. Furthermore, the on-orbit BTS could set minimum and maximum timeslot synchronization offsets and Doppler compensation for its channels based on minimum and maximum pseudo distance and Doppler shift measurements, respectively. This allows the BTS to more granularly define the grid cell of its satellite footprint and more effectively assign channels to service higher density pockets of MSs. A more refined interval for Doppler blocks further reduces effect of Doppler shift on each channel while a more refined interval for pseudo distance range rings increases potential throughput in more specific ring locations to service more densely packed MSs.

On-board processing could also leverage known satellite velocity to predict the motion of the satellite footprint, and therefore, the pseudo distance and Doppler shift contours, relative to the MSs that it services. This would allow the satellite BTS to predict which pseudo distance and Doppler shift buckets will require channel allotment in the near future and which will not; predictability would enable more precise execution of channel allotment scheme reconfigurations. Since there will be some lead time associated with channel reconfiguration, predictability could be powerfully leveraged to ensure limited down time for its channels. For instance, to account for this channel reconfiguration lead time, the on-orbit BTS could "juggle", or reserve, one or more channels such that the carrier frequencies that are servicing MSs do not need to abruptly stop service in order to be reconfigured. Since channels must be configured in order of increasing or decreasing frequency, reconfiguration can sometimes create a domino effect and require many channels to be reconfigured to maintain this critical frequency ordering in the channel allocation scheme. For instance, consider a GSM BTS on-orbit with access to 80 channels in the GSM spectrum. Assuming the channels are labeled 1 to 124, every odd channel (i.e., 1, 3, 5, 7, etc.) could be configured to service MSs while every even channel (i.e., 2, 4, 6, 8, etc.) could be "juggled", or reserved. When the need emerges for reconfiguration, the on-orbit BTS can reconfigure a "juggled" channel and does not need to disrupt service on one of its other 62 already configured channels. When a configured channel is no longer servicing MSs, it can be cycled into the reserved, or "juggled", channel set and the process repeats itself maintaining consistent service and limiting channel down time.

The on-orbit BTS can be programmed to use real-time measurements of pseudo distance, Doppler shift, and other data (i.e., GPS) of the MSs to further enhance the quality of service of such a network. Examples include re-allocation or shifting of the channels based on large data sets gathered over time and many satellite passes (based on relatively static locations of MSs) and more dynamic real-time shifting based on changes in MS distributions that have been sensed by the spacecraft that passed over this location just prior to the present spacecraft, or even by the present spacecraft.

The dynamic channel allocation described above could also be done in a way that allows a particular channel to be dedicated to a particular MS, or geographic location, for the entirety of the satellite overpass. In other words, a certain channel's Doppler shift and pseudo distance configuration, if plotted over time, would be described by some smooth function that matches the Doppler shift and pseudo distance environment experienced by a certain MS, or geographical location, over the course of an overpass. This embodiment could be strategic under conditions when a certain MS on the ground needs to maintain or benefits from a locked link with the satellite for a longer period of time (e.g., minutes instead of seconds).

Consider the case illustrated in FIG. 20 where the connected MSs are operating in a "clump"—perhaps a remote village. As a reminder, the map shows only half of a satellite footprint because the pseudo distance and Doppler shift buckets are symmetric about the satellite velocity vector. When the spacecraft gathers the pseudo distance and Doppler shift data from these users, it could strategically prorate channel allotment in its channel allocation scheme and reprogram its channels to shift their service configuration based on this proration. A technique like this could also leverage predictive data analytics software. The on-orbit BTS could marry historic MS data with GPS navigation data to predict where and when it will come across dense pockets of customers in its footprint. GPS data from MSs that are actually serviced could also be used to further enhance predictive analytics and allocation of channels, and tracking applications. This could drive an increase in the quality of service for such a network.

Figure 22:
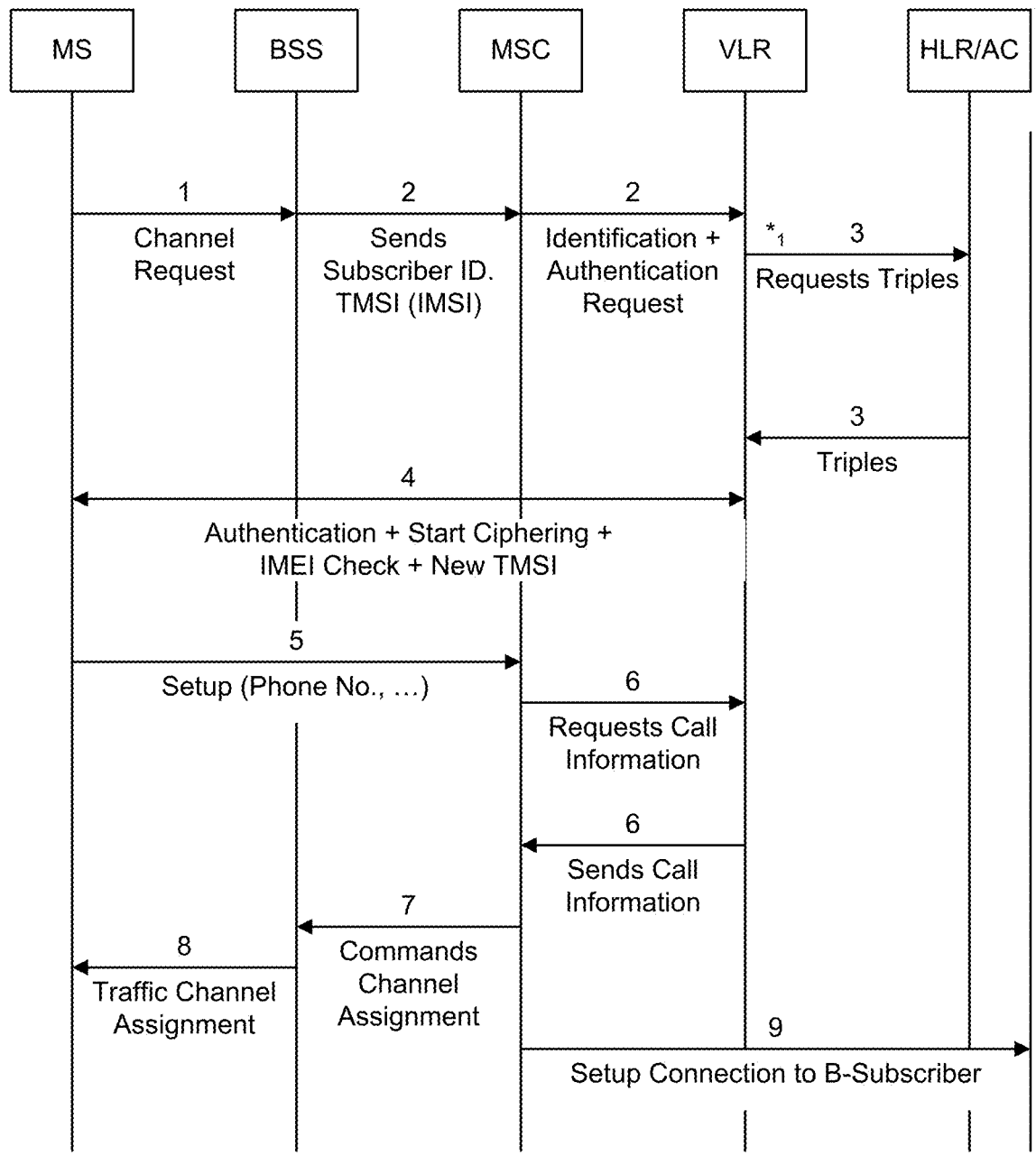
FIG. 22 is a swim diagram illustrating a process for setup and distance determination.

FIG. 22 illustrates a process for determining parameters for a MS in a RACH process. By measuring propagation delays from MS uplink bursts, a BTS can calculate the required timing advance for each MS to transmit bursts at the correct time. A RACH process might be that (1) the MS listens to the BCCH as it camps on a BTS, (2) the user of the MS types a text message and hits "send," (3) the MS, using the information provided on the BCCH, requests access to a channel by sending a burst on the RACH, (4) the BTS looks up the channel assignment and responds with a channel assignment as well as a timing advance (in bits), and (5) the MS uses the timing advance to advance its bursts relative to the time slot that it has been assigned and uses the frequency carrier it was assigned.

In the more general case, illustrated in FIG. 22, an MS requests for the allocation of a dedicated signaling channel to perform the call setup, and after allocation of a signaling channel, the request for MOC call setup, included the TMSI (IMSI) and the last LAI, is forwarded to the VLR. The VLR requests the AC via HLR for Triples (if necessary). Then, the VLR initiates Authentication, Cipher start, IMEI check (optional) and TMSI Re-allocation (optional). If all of this did not cause an error requiring cancellation of the process, the MS sends the Setup information (number of requested subscriber and detailed service description) to the MSC and the MSC requests the VLR to check (from the subscriber data) whether the requested service and number can be handled (or if there are restrictions that do not allow further proceeding of the call setup).

If the VLR indicates that the call should be handled, the MSC commands the BSC to assign a traffic channel to the MS and the BSC assigns a Traffic Channel TCH to the MS. The MSC then sets up the connection to requested number (called party).

According to one embodiment, the techniques described herein are implemented by one or generalized computing systems programmed to perform the techniques pursuant to program instructions in firmware, memory, other storage, or a combination. Special-purpose computing devices may be used, such as desktop computer systems, portable computer systems, handheld devices, networking devices or any other device that incorporates hard-wired and/or program logic to implement the techniques.

Figure 23:
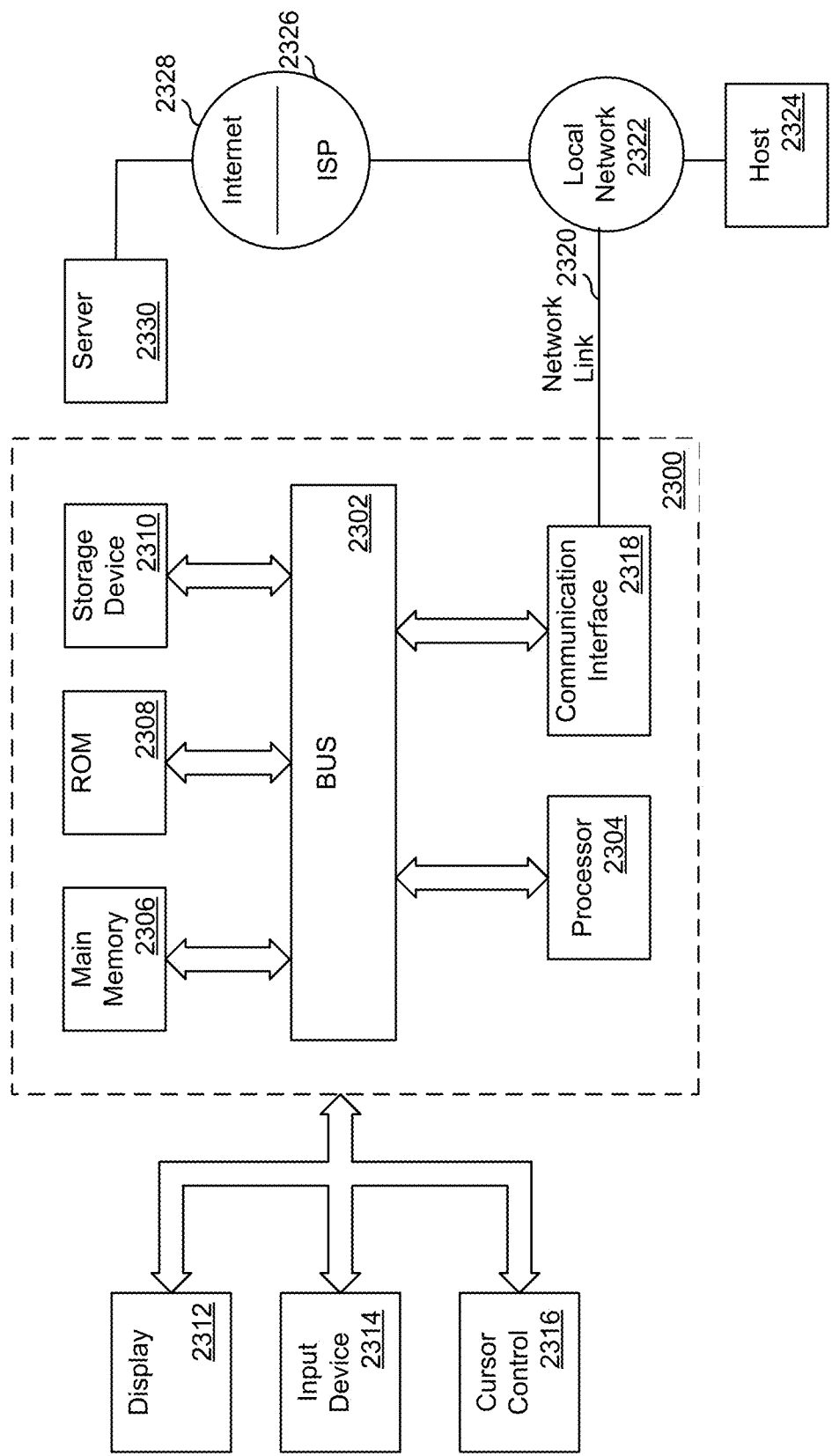
FIG. 23 illustrates an example transceiver and related components.

For example, FIG. 23 is a block diagram that illustrates a computer system 2300 upon which an embodiment of the invention may be implemented. Computer system 2300 includes a bus 2302 or other communication mechanism for communicating information, and a processor 2304 coupled with bus 2302 for processing information. Processor 2304 may be, for example, a general purpose microprocessor.

Computer system 2300 also includes a main memory 2306, such as a random access memory (RAM) or other dynamic storage device, coupled to bus 2302 for storing information and instructions to be executed by processor 2304. Main memory 2306 also may be used for storing temporary variables or other intermediate information during execution of instructions to be executed by processor 2304. Such instructions, when stored in non-transitory storage media accessible to processor 2304, render computer system 2300 into a special-purpose machine that is customized to perform the operations specified in the instructions.

Computer system 2300 further includes a read only memory (ROM) 2308 or other static storage device coupled to bus 2302 for storing static information and instructions for processor 2304. A storage device 2310, such as a magnetic disk or optical disk, is provided and coupled to bus 2302 for storing information and instructions.

Computer system 2300 may be coupled via bus 2302 to a display 2312, such as a computer monitor, for displaying information to a computer user. An input device 2314, including alphanumeric and other keys, is coupled to bus 2302 for communicating information and command selections to processor 2304. Another type of user input device is cursor control 2316, such as a mouse, a trackball, or cursor direction keys for communicating direction information and command selections to processor 2304 and for controlling cursor movement on display 2312. This input device typically has two degrees of freedom in two axes, a first axis (e.g., x) and a second axis (e.g., y), that allows the device to specify positions in a plane.

Computer system 2300 may implement the techniques described herein using customized hard-wired logic, one or more ASICs or FPGAs, firmware and/or program logic which in combination with the computer system causes or programs computer system 2300 to be a special-purpose machine. According to one embodiment, the techniques herein are performed by computer system 2300 in response to processor 2304 executing one or more sequences of one or more instructions contained in main memory 2306. Such instructions may be read into main memory 2306 from another storage medium, such as storage device 2310. Execution of the sequences of instructions contained in main memory 2306 causes processor 2304 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 2310. Volatile media includes dynamic memory, such as main memory 2306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 2302. Transmission media can also take the form of acoustic or light waves, such as those generated during radio-wave and infra-red data communications.

Various forms of media may be involved in carrying one or more sequences of one or more instructions to processor 2304 for execution. For example, the instructions may initially be carried on a magnetic disk or solid state drive of a remote computer. The remote computer can load the instructions into its dynamic memory and send the instructions over a network connection. A modem or network interface local to computer system 2300 can receive the data. Bus 2302 carries the data to main memory 2306, from which processor 2304 retrieves and executes the instructions. The instructions received by main memory 2306 may optionally be stored on storage device 2310 either before or after execution by processor 2304.

Computer system 2300 also includes a communication interface 2318 coupled to bus 2302. Communication interface 2318 provides a two-way data communication coupling to a network link 2320 that is connected to a local network 2322. For example, communication interface 2318 may be an integrated services digital network (ISDN) card, cable modem, satellite modem, or a modem to provide a data communication connection to a corresponding type of telephone line. Wireless links may also be implemented. In any such implementation, communication interface 2318 sends and receives electrical, electromagnetic or optical signals that carry digital data streams representing various types of information.

Network link 2320 typically provides data communication through one or more networks to other data devices. For example, network link 2320 may provide a connection through local network 2322 to a host computer 2324 or to data equipment operated by an Internet Service Provider (ISP) 2326. ISP 2326 in turn provides data communication services through the world wide packet data communication network now commonly referred to as the "Internet" 2328. Local network 2322 and Internet 2328 both use electrical, electromagnetic or optical signals that carry digital data streams. The signals through the various networks and the signals on network link 2320 and through communication interface 2318, which carry the digital data to and from computer system 2300, are example forms of transmission media.

Computer system 2300 can send messages and receive data, including program code, through the network(s), network link 2320 and communication interface 2318. In the Internet example, a server 2330 might transmit a requested code for an application program through Internet 2328, ISP 2326, local network 2322 and communication interface 2318. The received code may be executed by processor 2304 as it is received, and/or stored in storage device 2310, or other non-volatile storage for later execution.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Further embodiments can be envisioned to one of ordinary skill in the art after reading this disclosure. In other embodiments, combinations or sub-combinations of the above-disclosed invention can be advantageously made. The example arrangements of components are shown for purposes of illustration and it should be understood that combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

All references, including publications, patent applications, and patents, cited herein are hereby incorporated by reference to the same extent as if each reference were individually and specifically indicated to be incorporated by reference and were set forth in its entirety herein.

What is claimed is:

1. A method for determining a location of a first terrestrial mobile station from signaling along a communication path including an orbital portion of the communication path, wherein the orbital portion is between a multiple-access transceiver in the communication path and the first terrestrial mobile station, the method comprising:
    parsing signals received by the multiple-access transceiver into received signals, according to a frame structure, wherein the frame structure defines which timeslots are allocated to which of a plurality of terrestrial mobile stations;
    determining an orbit-terrestrial propagation delay over the orbital portion of the communication path from parsing of the received signals;
    determining a corresponding communication distance from the orbit-terrestrial propagation delay;
    determining a first orbital location of the multiple-access transceiver when the received signals were received; and
    calculating the location of the terrestrial mobile station from the corresponding communication distance and the first orbital location.

2. The method of claim 1, wherein parsing the signals received is performed by a programmable radio capable of communicating a communication from the multiple-access transceiver to the first terrestrial mobile station using a multiple-access protocol and taking into account the corresponding communication distance, such that the communication is compatible with, or appears to the first terrestrial mobile station to be, communication between a terrestrial cellular base station and the first terrestrial mobile station.

3. The method of claim 1, wherein the multiple-access transceiver is housed in a first satellite operable in Earth orbit, the method further comprising:

parsing additional signals from the first terrestrial mobile station at a second orbital transceiver that orbits in a second orbit distinct from a first orbit of the first satellite;

determining a second corresponding communication distance between the second orbital transceiver and the first terrestrial mobile station using the additional signals; and calculating the location of the first terrestrial mobile station from the corresponding communication distance, the first orbital location, the second corresponding communication distance, and a second orbital location of the second orbital transceiver.

4. The method of claim 1, wherein parsing the signals received by the multiple-access transceiver comprises parsing the signals on either a Random-Access Control Channel (RACH) channel or a traffic channel.

5. The method of claim 1, wherein the first terrestrial mobile station is a cellular telephone handset, a smartphone, and/or a connected device.

6. The method of claim 1, further comprising:
determining timing of received signals of the first terrestrial mobile station relative to the frame structure based on the corresponding communication distance; and
allocating a listening timeslot in the frame structure to listen for communications from the first terrestrial mobile station where the listening timeslot is timed based on the corresponding communication distance of the first terrestrial mobile station and the listening timeslot is one of a plurality of timeslots that are variably delayed in the frame structure to account for handling communications at the multiple-access transceiver from the plurality of terrestrial mobile stations having a plurality of corresponding communication distances.

7. The method of claim 6, wherein the plurality of timeslots are variably delayed in the frame structure to account for handling the communications at the multiple-access transceiver from the plurality of terrestrial mobile stations having the plurality of corresponding communication distances by assigning each of a plurality of different communication distance ranges to each of a plurality of channel blocks.

8. The method of claim 7, wherein the plurality of different communication distance ranges collectively cover a slant range from a zenith distance through a minimum elevation distance, wherein the zenith distance is a first distance between a zenith position of a satellite carrying the multiple-access transceiver relative to the first terrestrial mobile station and wherein the minimum elevation distance is a second distance between a position of the satellite when the first terrestrial mobile station enters a design footprint of the satellite.

9. The method of claim 1,
wherein the first terrestrial mobile station is configured to expect communications with a terrestrial cellular base station over the communication path (1) within a limited communication distance between the first terrestrial mobile station and the multiple-access transceiver, and/or (2) with communication path elements moving less than a limited velocity relative to each other,
wherein the frame structure comprises a plurality of slots each having a zero or nonzero timeslot synchronization offset that provides for variable transmission delays that are due to a first communication distance between the multiple-access transceiver and the first terrestrial mobile station, and wherein a signal timing module adjusts timing of transmitted signals relative to the frame structure for the transmitted signals to the first terrestrial mobile station based on the first communication distance where the first communication distance exceeds the limited communication distance, notwithstanding that the first communication distance exceeds the limited communication distance.

10. The method of claim 1, wherein the location of the first terrestrial mobile station is determined using signals received by three or more orbital base stations each determining a corresponding respective distance and a corresponding respective Doppler shift.

11. The method of claim 1, further comprising allocating capacity of the multiple-access transceiver to the plurality of terrestrial mobile stations, including the first terrestrial mobile station, distributed over a plurality of timeslots, a plurality of carrier frequencies, a plurality of orthogonal subcarriers and/or a plurality of code sequences.

12. The method of claim 1, further comprising:
storing previously determined terrestrial mobile station locations; and
when the received signals are from a given terrestrial mobile station for which a terrestrial mobile station location is stored, using a stored terrestrial mobile station location in determining a current terrestrial mobile station location for the given terrestrial mobile station.

13. A method for determining a location of a first terrestrial mobile station from signaling along a communication path including an orbital portion of the communication path, wherein the orbital portion is between a multiple-access transceiver in the communication path and the first terrestrial mobile station, the method comprising:
parsing signals received by the multiple-access transceiver into received signals, according to a multiple-access protocol in which the first terrestrial mobile station expects to receive signals at a first specified frequency and to transmit signals at a second specified frequency;
determining, for each terrestrial mobile station of a plurality of terrestrial mobile stations, its respective Doppler shift due to a velocity of a first communication path element in the communication path relative to a second communication path element in the communication path;
determining a first orbital location and a first orbital velocity of the multiple-access transceiver when the received signals were received; and
calculating the location of the terrestrial mobile station from the respective Doppler shift and the first orbital velocity.

14. The method of claim 13, wherein the multiple-access transceiver is housed in a first satellite operable in Earth orbit.

15. The method of claim 13, further comprising:
assigning each of the plurality of terrestrial mobile stations to channel blocks in a plurality of channel blocks, wherein each channel block has a terrestrial frequency and a Doppler frequency offset;
modulating signals to the first terrestrial mobile station at the terrestrial frequency with the Doppler frequency offset, wherein the Doppler frequency offset at least approximately corresponds with an expected Doppler shift in signals transmitted to the first terrestrial mobile station due to relative movement of the first communication path element and the second communication path element so that the first terrestrial mobile station receives the signal at the terrestrial frequency; and receiving a communication from the first terrestrial mobile station using the multiple-access protocol and taking into account the Doppler frequency offset of the first terrestrial mobile station, such that the communication is compatible with, or appears to the first terrestrial mobile station to be, communication between a terrestrial cellular base station and the first terrestrial mobile station, notwithstanding that the velocity of the first communication path element relative to the second communication path element exceeds a limited velocity.

16. The method of claim 15, wherein the velocity of the first communication path element relative to the second communication path element is a result of the first communication path element or the second communication path element being in Earth orbit, and wherein the Doppler frequency offset varies in 5 kilohertz increments.

17. The method of claim 15, wherein each of the plurality of channel blocks has an uplink subchannel and a downlink subchannel with a first contiguous spectrum for uplink subchannels and a second contiguous spectrum for downlink subchannels, and the channel blocks are assigned such that adjacent channel blocks are assigned to adjacent Doppler frequency offsets.

18. The method of claim 15, wherein the multiple-access transceiver is in Earth orbit and the plurality of channel blocks are allocated based on relative positions of the first terrestrial mobile station and a satellite carrying the multiple-access transceiver.

19. The method of claim 13, further comprising allocating capacity of the multiple-access transceiver to the plurality of terrestrial mobile stations, including the first terrestrial mobile station, distributed over a plurality of timeslots, a plurality of carrier frequencies, a plurality of orthogonal subcarriers and/or a plurality of code sequences.

20. The method of claim 13, further comprising:
storing previously determined terrestrial mobile station locations; and
when the received signals are from a given terrestrial mobile station for which a terrestrial mobile station location is stored, using a stored terrestrial mobile station location in determining a current terrestrial mobile station location for the given terrestrial mobile station.

21. The method of claim 13, wherein the location of the first terrestrial mobile station is determined using signals received by three or more orbital base stations each determining a corresponding respective distance and a corresponding respective Doppler shift.

* * * * *